US009920155B2

(12) United States Patent
Matsumoto et al.

(10) Patent No.: US 9,920,155 B2
(45) Date of Patent: Mar. 20, 2018

(54) RESIN PARTICLES, CONDUCTIVE MICROPARTICLES, AND ANISOTROPIC CONDUCTIVE MATERIAL USING SAME

(71) Applicant: NIPPON SHOKUBAI CO., LTD., Osaka (JP)

(72) Inventors: Kazuaki Matsumoto, Osaka (JP); Yohei Okubo, Osaka (JP); Tomonari Takata, Hyogo (JP); Junko Kita, Osaka (JP); Naoki Kobayashi, Osaka (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 16 days.

(21) Appl. No.: 15/126,621

(22) PCT Filed: Mar. 18, 2015

(86) PCT No.: PCT/JP2015/058035
§ 371 (c)(1),
(2) Date: Sep. 16, 2016

(87) PCT Pub. No.: WO2015/141716
PCT Pub. Date: Sep. 24, 2015

(65) Prior Publication Data
US 2017/0096515 A1    Apr. 6, 2017

(30) Foreign Application Priority Data

Mar. 18, 2014 (JP) ................................. 2014-055361
Oct. 23, 2014 (JP) ................................. 2014-216368

(51) Int. Cl.
*C08F 290/06* (2006.01)
(52) U.S. Cl.
CPC .............................. *C08F 290/068* (2013.01)

(58) Field of Classification Search
CPC .................................................. C08F 290/068
See application file for complete search history.

(56) References Cited

U.S. PATENT DOCUMENTS

| 6,770,369 B1 | 8/2004 | Oyamada et al. |
| 2008/0124552 A1 | 5/2008 | Hashiba et al. |
| 2013/0095324 A1 | 4/2013 | Inokuchi |

FOREIGN PATENT DOCUMENTS

| JP | 2-289665 | 11/1990 |
| JP | 8-73543 | 3/1996 |

(Continued)

OTHER PUBLICATIONS

International Search Report dated Jun. 16, 2015 in International (PCT) Application No. PCT/JP2015/058035.

(Continued)

*Primary Examiner* — Alexandre F Ferre
(74) *Attorney, Agent, or Firm* — Wenderoth, Lind & Ponack, L.L.P.

(57) ABSTRACT

The object of the present invention is to provide a resin particle having a protrusion that is more resistant to the detachment and having a uniform protrusion size and protrusion distribution density. The resin particle of the present invention comprises: a spherical part and a peripheral part having a plurality of convex part formed on the surface of the spherical part, wherein the spherical part and the peripheral part comprise a vinyl polymer and/or a polysiloxane component, the spherical part and the peripheral part are different in the composition, the melting point of the peripheral part is not less than 200° C., and the curvature center of the boundary between the peripheral part and the spherical part determined by a transmission electron microscope observation of the cross-section of the resin particle exists in the spherical part.

10 Claims, 7 Drawing Sheets

(56) References Cited

FOREIGN PATENT DOCUMENTS

| | | |
|---|---|---|
| JP | 10-310616 | 11/1998 |
| JP | 10-316724 | 12/1998 |
| JP | 2000-264936 | 9/2000 |
| JP | 2005-187765 | 7/2005 |
| JP | 3696429 | 9/2005 |
| JP | 2008-19349 | 1/2008 |
| JP | 2010-229303 | 10/2010 |
| JP | 4640531 | 3/2011 |
| JP | 2011-207974 | 10/2011 |
| JP | 2013-87141 | 5/2013 |
| WO | 2005/113650 | 12/2005 |

OTHER PUBLICATIONS

Office Action dated Jan. 10, 2017 in corresponding Japanese Application No. 2016-508758, with English Translation.
Extended European Search Report dated Oct. 18, 2017 in corresponding European Application No. 15765194.4.

[Fig. 1]
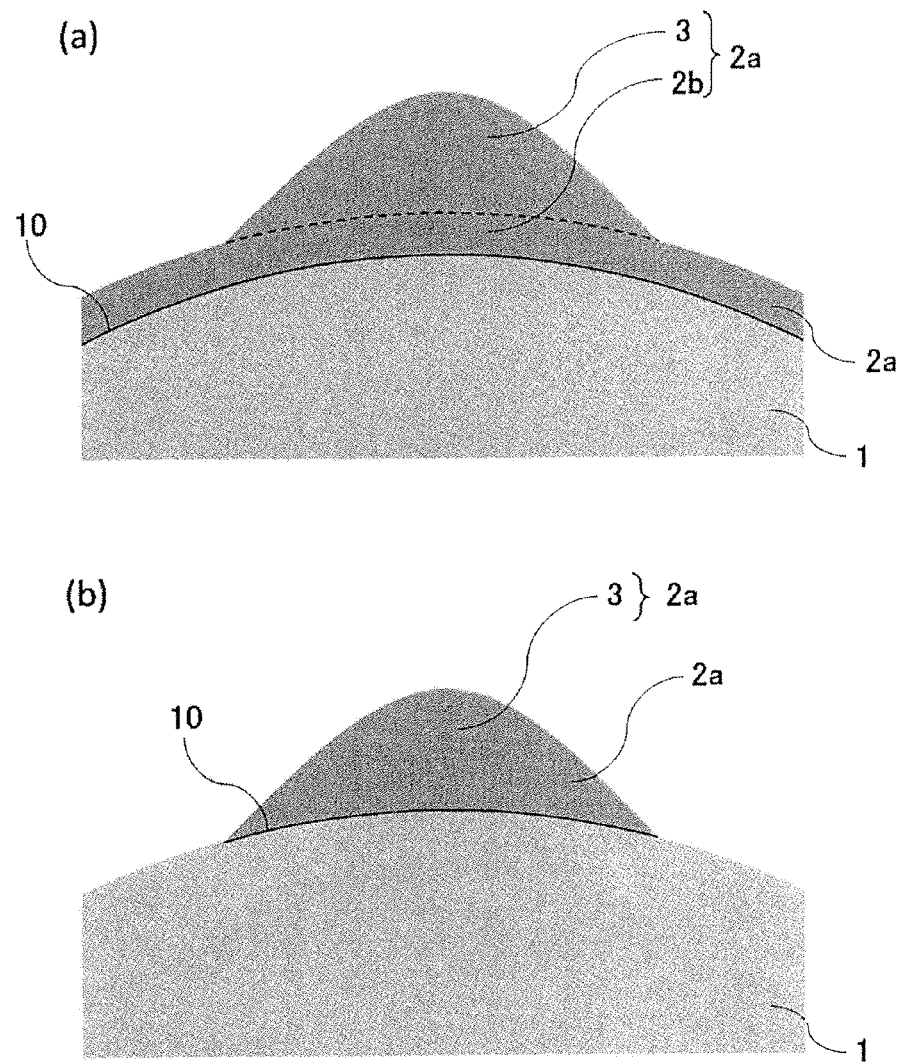

[Fig. 2]
(a)
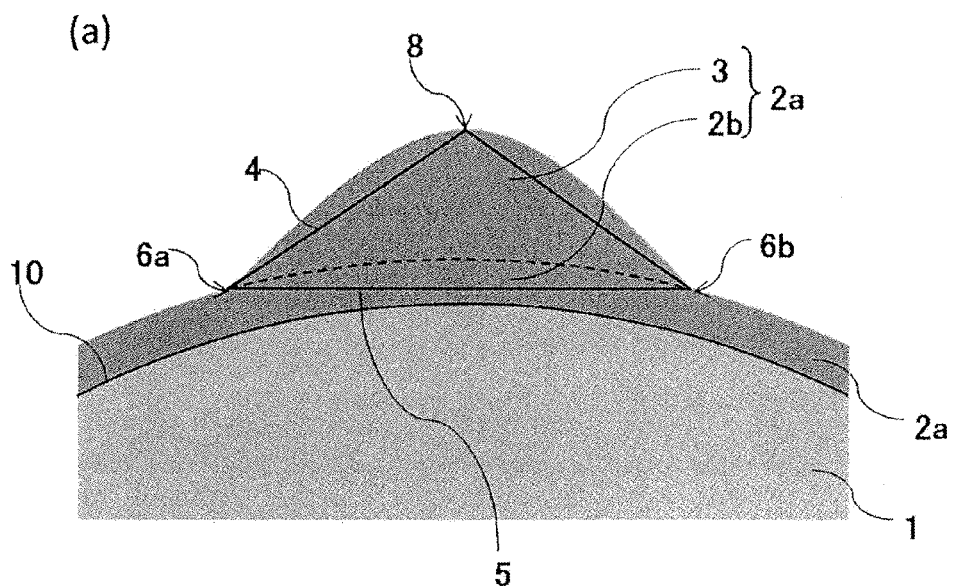
(b)
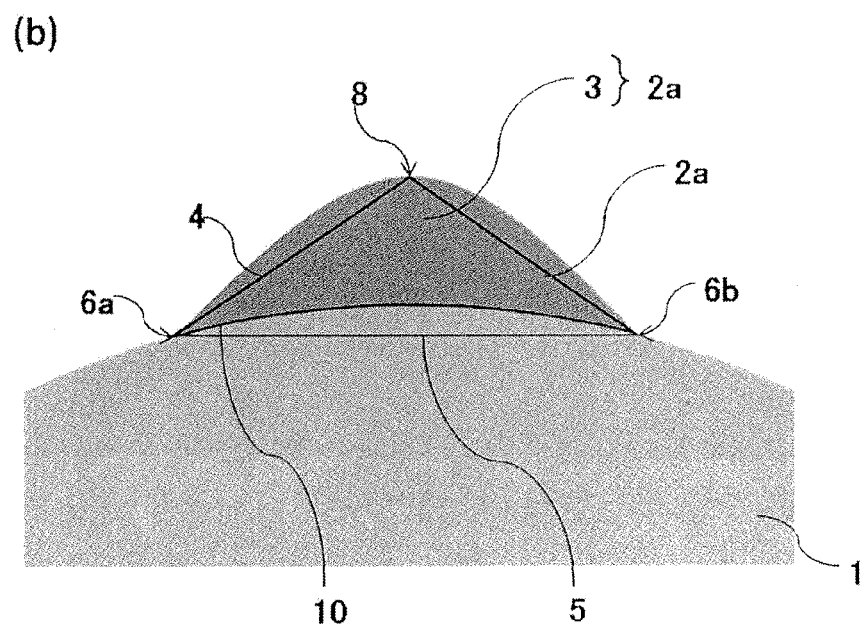

[Fig. 3]
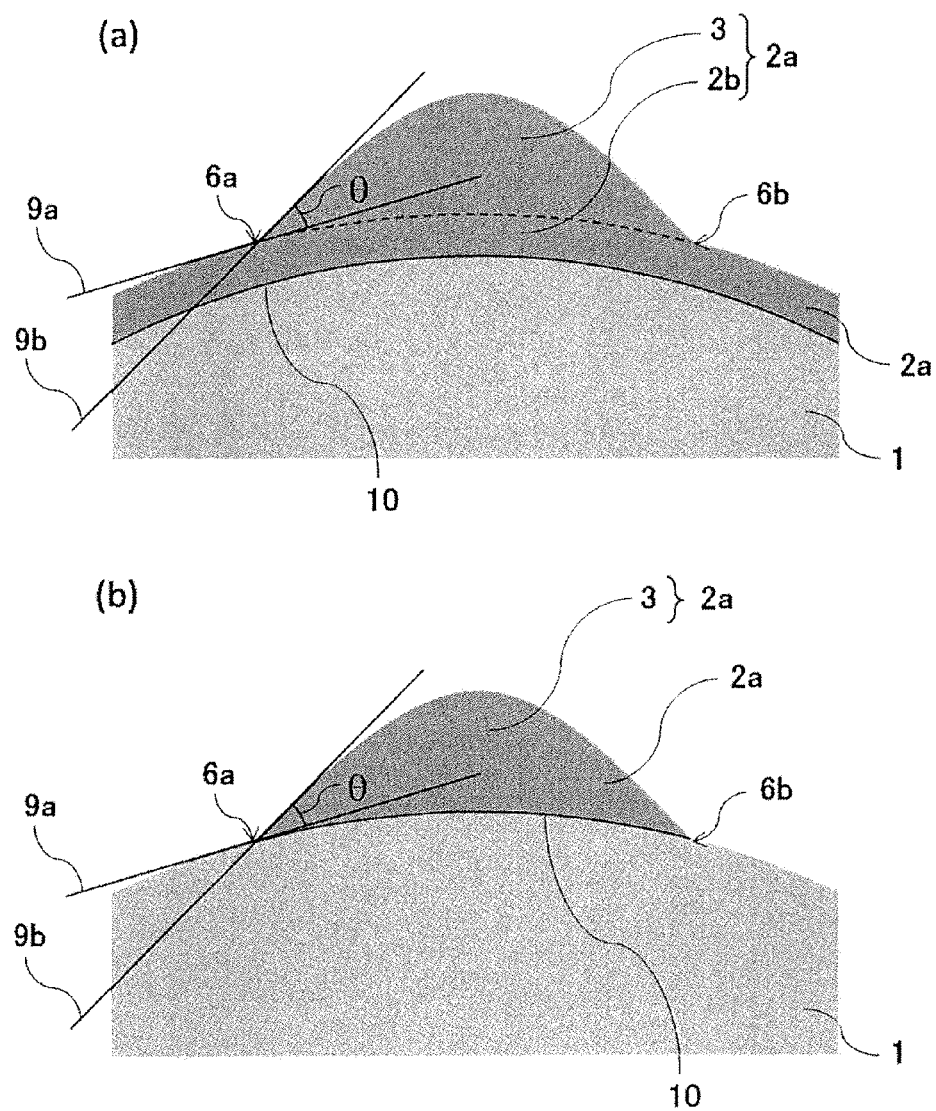

[Fig. 4]
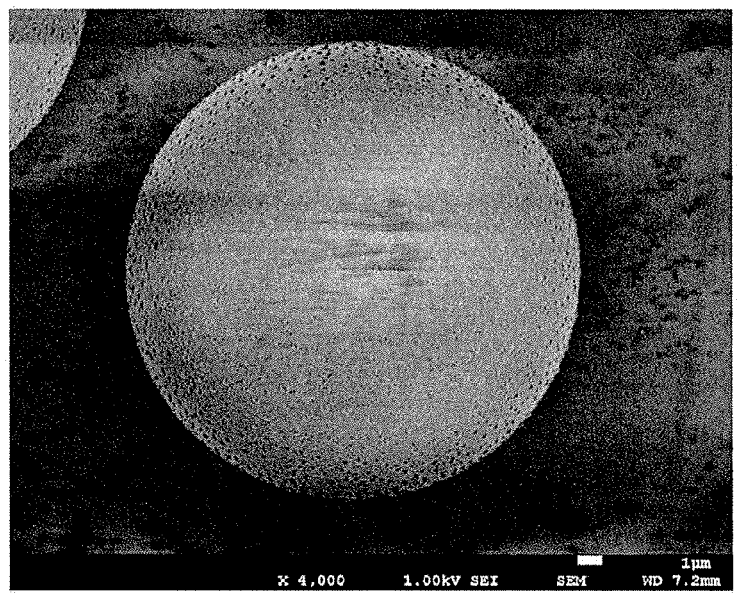
[Fig. 5]
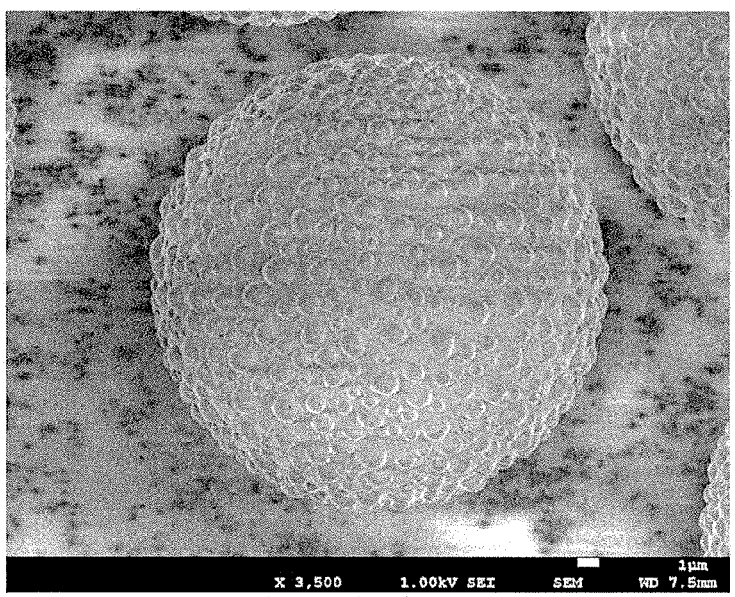

[Fig. 6]
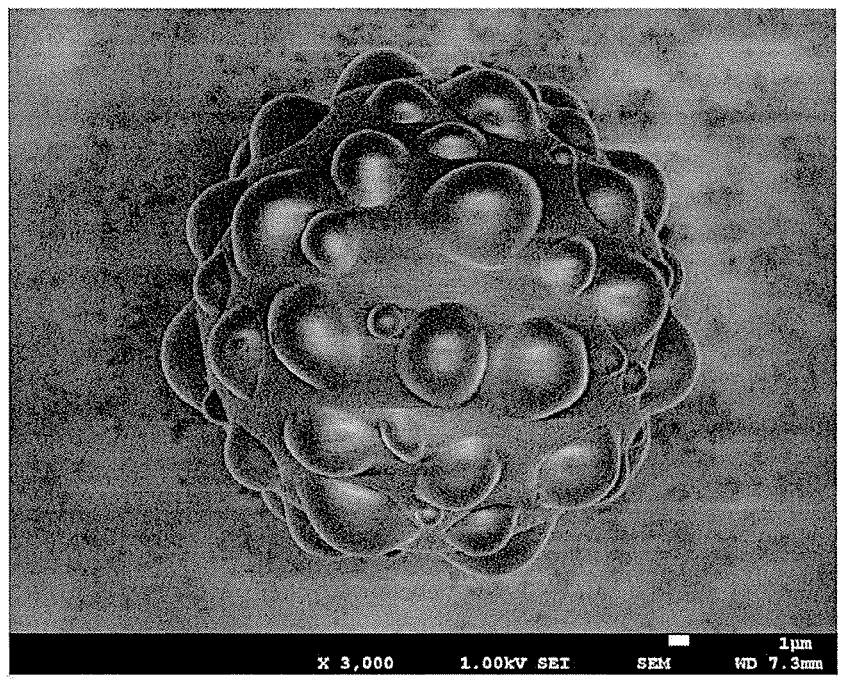

[Fig. 7]
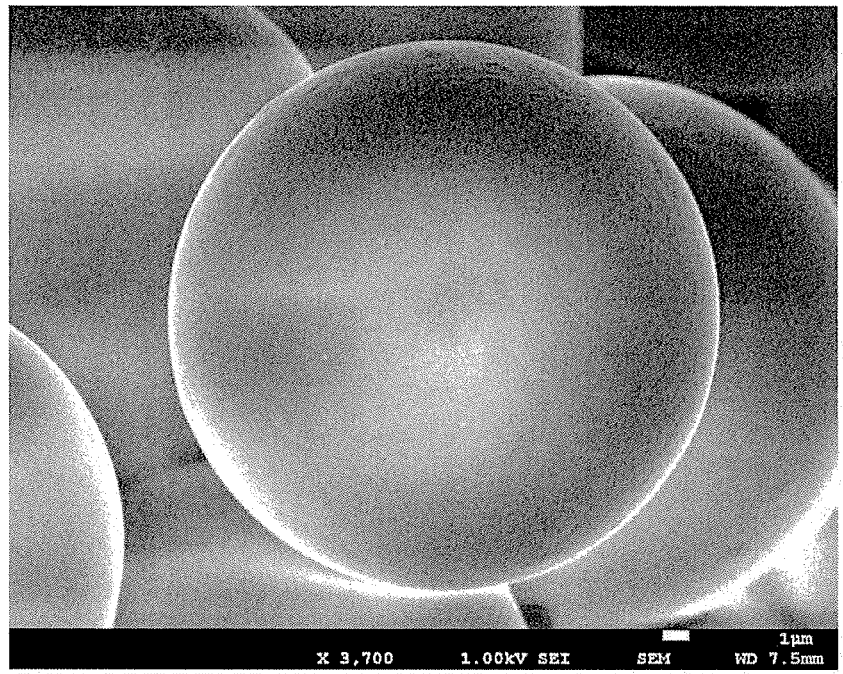
[Fig. 8]
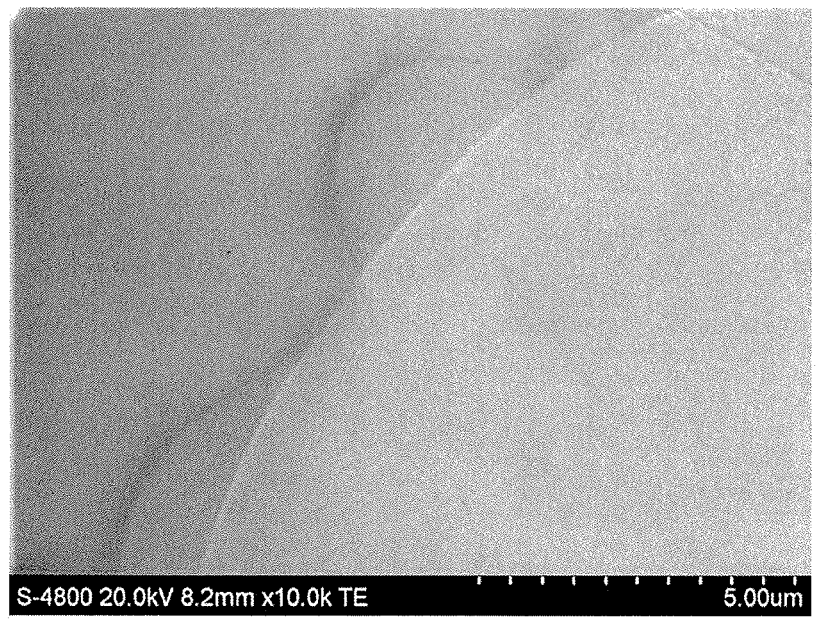

[Fig. 9]
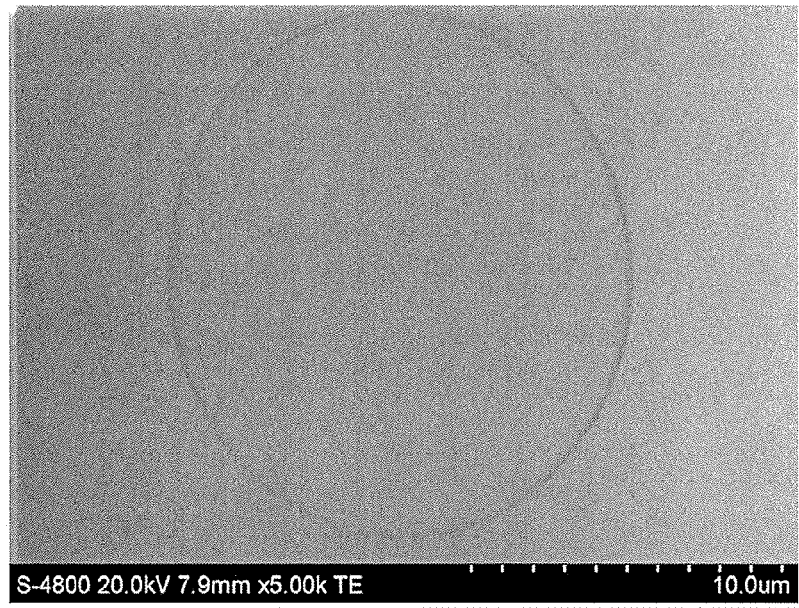
[Fig. 10]
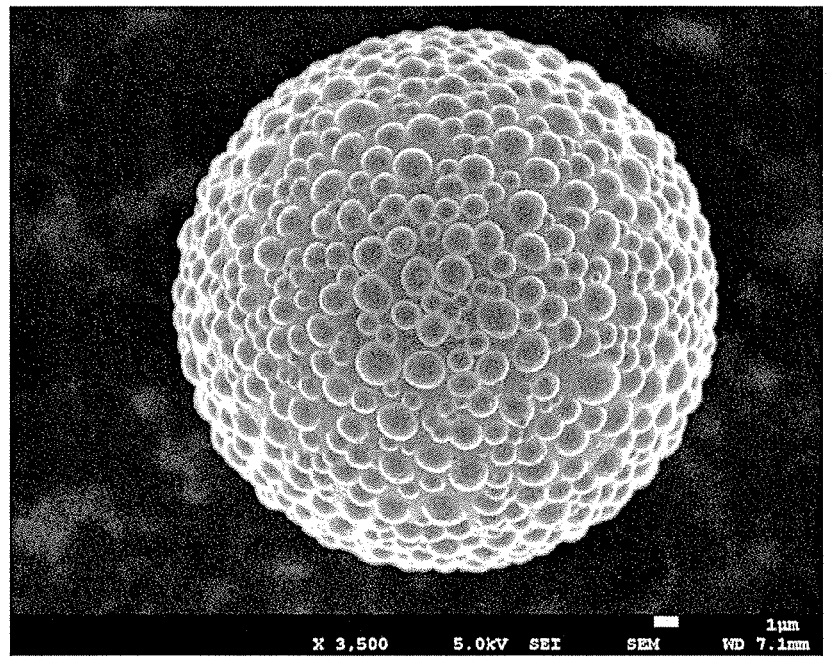

RESIN PARTICLES, CONDUCTIVE MICROPARTICLES, AND ANISOTROPIC CONDUCTIVE MATERIAL USING SAME

TECHNICAL FIELD

The present invention relates to a resin particle having a convex part, a conductive microparticle having a protrusion, and an anisotropic conductive material using the same.

BACKGROUND ART

Conventionally, a resin particle having a protrusion is applied to extensive uses such as resin additives (an anti-blocking agent and a light diffusion agent), delustering agents, toner additives, powder paints, water-dispersed paints, decoration boards additives, artificial marble stone additives, cosmetics fillers, chromatographic column packings, and substrates of conductive microparticles. The resin particle used for these uses (particularly, the resin particle used as the resin additives and the substrates of the conductive microparticles) is desired to have a protrusion that is resistant to the detachment from the resin particle, and have a uniform protrusion size and protrusion distribution density.

That is, the size and the light diffusivity of the protrusion are closely related since the light scattering mainly occurs at the interface (surface) of the resin particles when the resin particle having a protrusion is blended in a resin film as the resin additive such as a light diffusion agent. Accordingly, the light scattering intensity decreases when the protrusion size and the protrusion distribution density becomes not uniform, and it results in the deterioration problem in light diffusivity. In the case where the resin particle having a protrusion is blended in a resin film as the resin additives such as an anti-blocking agent, the detachment of the protrusion by friction disadvantageously causes deterioration in blocking resistance, and the damage on the surrounding resin film due to the detached protrusion. Furthermore, in the case where the resin particle is applied to the substrate of the conductive microparticle, the detachment of the protrusion causes a problem that conductive connection stability provided by the protrusion is not be expected. Therefore, as the resin particle having a protrusion, it is desired to have a protrusion that is more resistant to the detachment, and have a uniform protrusion size and protrusion distribution density.

Therefore, resin particles having various protrusions are proposed. For example, Patent Document 1 proposes a resin particle obtained by subjecting a vinyl-based monomer and a non-crosslinking acrylic polymer to suspension polymerization in the presence of a unresponsive phosphate compound as a surfactant. Patent Document 2 proposes a concavo-convex particle obtained by chemically bonding a small-diameter particle on the surface of a large-diameter particle with the mutually reactive functional group applied on the surface of two kind of particles with different diameter. Furthermore, Patent Document 3 proposes a silicone microparticle obtained by producing granular polyorgano silsesquioxane via condensation of organotrialkoxysilane to adhere to the surface of a silicone elastomer spherical microparticle.

Conventionally, a connection method using an anisotropic conductive material is adopted in order to provide electric connection between a large number of facing electrodes or wirings in the assembly of an electronic device. The anisotropic conductive material is a material obtained by dispersing conductive microparticles in a binder resin. Examples thereof include an anisotropic conductive paste (ACP), an anisotropic conductive film (ACF), an anisotropic conductive ink, and an anisotropic conductive sheet. Used as the conductive microparticle for an anisotropic conductive material is conductive microparticle obtained by covering the surface of the resin particle as a substrate with a conductive metal layer as well as a metal particle. In the conductive microparticle comprising the resin particle and the conductive metal layer, electric connection between electrodes or wirings is provided by the metal layer having conductivity formed on the surface.

In this case, in order to secure sufficient conductive connection reliability, several attempts are made to form a protrusion on the conductive microparticle surface. For example, Patent Document 4 describes a method including simultaneously forming a minute protrusion when forming a nickel or nickel alloy coating on the surface of a spherical core particle with a electroless plating method. However, this method uses the abnormal precipitation of a plating and it is necessary to control an electroless plating condition to a special condition in order to form the minute protrusion, and therefore it becomes difficult to control the shape of the minute protrusion to a fixed range in some cases. Patent Document 5 describes a method to form a protrusion part by adsorbing a non-conductive inorganic particle to a plastic core and forming a metal plating layer, however, the protrusion part tends to be detached when the adsorption force of the plastic core and non-conductive inorganic particle is not adequate, and sufficient conductive connection reliability is not acquired in some cases.

PRIOR ART DOCUMENTS

Patent Documents

Patent Document 1: JP 2011-207974 A
Patent Document 2: WO 2005/113650
Patent Document 3: JP 2013-87141 A
Patent Document 4: JP 3696429 B
Patent Document 5: JP 4640531 B

SUMMARY OF THE INVENTION

Problems to be Solved by the Invention

It was found that in these resin particles, the size of the protrusion and the distribution density of the protrusion are not uniform, and the protrusion tends to be detached in some cases. In light of the circumstances, the object of the present invention is to provide a resin particle having a protrusion that is more resistant to the detachment and having a uniform protrusion size and protrusion distribution density.

The object of the present invention is to further provide a conductive microparticle that is capable of suppressing the detachment of a protrusion to secure sufficient conductive connection reliability regardless of the plating condition.

Solutions to the Problems

The present inventors have conducted intensive research in order to solve the problem, and found as a result that for controlling the protrusion (convex part) shape (size, distribution density) it is important to design a material forming a protrusion portion (convex part) to be different from a material forming a particle portion (spherical part), and for suppressing the protrusion (convex part) detachment it is important to design the curvature center of the boundary between a portion including a protrusion (peripheral part having a convex part) and the particle portion (spherical part) to be in the spherical part. Consequently, the present invention has been accomplished.

The resin particle of the present invention comprises: a spherical part and a peripheral part having a plurality of convex part formed on the surface of the spherical part, wherein the spherical part and the peripheral part comprise a vinyl polymer and/or a polysiloxane component, the spherical part and the peripheral part are different in the composition, the melting point of the peripheral part is not less than 200° C., and the curvature center of the boundary between the peripheral part and the spherical part determined by a transmission electron microscope observation of the cross-section of the resin particle exists in the spherical part. It is preferred that the average height of the convex part is not less than 0.05 μm and not more than 5 μm in the resin particle.

The average diameter of the convex part base is not less than 0.1 μm and not more than 10 μm, the number density of the convex part is not less than 0.01 μm$^{-2}$ and not more than 10 and the convex part per one resin particle is not less than 5 and not more than 5000 in the resin particle. The volume average particle diameter is not less than 1 μm and not more than 50 μm.

The contact angle of the convex part is not more than 90° in the resin particle.

The resin particle preferably has a core-shell structure comprising a core and a shell, the core includes the spherical part and the shell includes the peripheral part.

Further, the present inventors found that a conductive microparticle with the suppressed detachment can be obtained regardless of the plating condition by using a resin particle having a specific convex part as a substrate, and established the present invention. Thus, A conductive microparticle of the present invention comprises the resin particle and a conductive metal layer covering the surface convex part of the resin particle along the shape of the convex part. An anisotropic conductive material comprising the conductive microparticle according is also included in the technical scope of the present invention.

Effects of the Invention

A resin particle of the present invention comprises: a spherical part and a peripheral part having a plurality of convex part formed on the surface of the spherical part, wherein the spherical part and the peripheral part comprise a vinyl polymer and/or a polysiloxane component, the spherical part and the peripheral part are different in the composition, the melting point of the peripheral part is not less than 200° C., and the curvature center of the boundary between the peripheral part and the spherical part determined by a transmission electron microscope observation of the resin particle cross-section exists in the spherical part. Therefore, the size of the convex part and the protrusion density is uniform, and the detachment of the convex part is suppressed.

Further, A conductive microparticle of the present invention comprises a resin particle having a specific convex part, and therefore the protrusion shape on the conductive microparticle is controllable and the protrusion detachment is suppressed as well.

BRIEF DESCRIPTION OF THE DRAWINGS

FIGS. 1A and 1B are schematic views of a protrusion portion of the cross-section of a resin particle of the present invention.

FIGS. 2A and 2B are schematic views of a protrusion portion of the cross-section of a resin particle of the present invention, and are views for describing the height and base (diameter) of a convex part.

FIGS. 3A and 3B are schematic views of a protrusion portion of the cross-section of a resin particle of the present invention, and are views for describing the contact angle of a convex part.

FIG. 4 shows the scanning electron microscope photograph (magnification ratio: 4,000) of a resin particle of Production Example 1.

FIG. 5 shows the scanning electron microscope photograph (magnification ratio: 3,500) of a resin particle of Production Example 2.

FIG. 6 shows the scanning electron microscope photograph (magnification ratio: 3,000) of a resin particle of Production Example 3.

FIG. 7 shows the scanning electron microscope photograph (magnification ratio: 3,700) of a resin particle of Production Example 8.

FIG. 8 shows the transmission electron microscope photograph (magnification ratio: 10,000) of a resin particle of Production Example 3.

FIG. 9 shows the transmission electron microscope photograph (magnification ratio: 5,000) of a resin particle of Production Example 8.

FIG. 10 shows the scanning electron microscope photograph (magnification ratio: 3,500) of a resin particle of Example 2.

MODE FOR CARRYING OUT THE INVENTION

1. Shape of Resin Particle

A resin particle of the present invention includes: a spherical part and a peripheral part having a plurality of convex part formed on the surface of the spherical part. The peripheral part is formed on the surface of the spherical part, and the spherical part is surrounded by the peripheral part. The peripheral part has the plurality of convex part. Further, the curvature center of the boundary between the peripheral part and the spherical part exists in the spherical part from a transmission electron microscope observation of the resin particle cross-section. The convex part becomes resistant to the detachment thereby. As described in the following, in the transmission electron microscope photograph of the resin particle cross-section, the peripheral part is usually displayed as a dark color part, and the spherical part is displayed as a light color part.

Hereinafter, the constitution of the resin particle is described using the drawings. FIGS. 1A and 1B show schematic views of a protrusion portion of a resin particle cross-section. As shown in FIG. 1A, a peripheral part (2a) having a convex part (3) exists on the spherical part (1) surface. The curvature center of a boundary (10) between the spherical part (1) and the peripheral part (2a) exists in the spherical part (1). The meaning of a curvature center of the boundary (10) existing in the spherical part (1) is that the boundary (10) is convex to a peripheral part side. Furthermore, the peripheral part (2a) may comprise a peripheral layer (2b) and the convex part (3).

The peripheral part (2a) may comprise only the convex part (3) without having the peripheral layer (2b) (that is, the thickness of the peripheral layer (2b) is 0 μm). Also in this case, as shown in FIG. 1B, the peripheral part (2a) having the convex part (3) exists on the surface of the spherical part (1). The curvature center of the boundary (10) between the spherical part (1) and the peripheral part (2a) exists in the spherical part (1).

The spherical part preferably has a globular shape having no protrusion in itself, and more preferably has a spherical shape. The curvature center of the boundary between the peripheral part and the spherical part in the resin particle cross-section exists in the spherical part, and it means that the boundary is a straight line or a curved line, and the bentness thereof faces a peripheral part side (outside). The curvature of the curved line is defined as the radius (curvature radius) of the osculating circle of the curved line. The absolute value of the variation rate between the curvature radius of the boundary between the peripheral and the spherical parts, and the radius of the spherical part ((curvature radius−radius of spherical part)/radius of spherical part) is preferably not more than 10%, and more preferably not more than 5%. In the case where the cross-section of the resin particle is provided by cutting the resin particle, a compressive stress may be applied to the resin particle, and therefore the spherical part boundary in a transmission electron microscope might not become spherical even if the spherical part has a spherical shape.

In the present invention, the convex part means the one having the product of a height (μm) and base diameter (μm), that is, a height×a base diameter ($\mu m^2$) of not less than 0.001 ($\mu m^2$). The product of the height and base diameter is more preferably not less than 0.005 ($\mu m^2$), and still more preferably not less than 0.009 ($\mu m^2$). The upper limit is not particularly limited, and usually not more than 50 ($\mu m^2$).

In the resin particle, the average height of the convex part is preferably not less than 0.05 μm and not more than 5 μm. As the average height of the convex part increases, effects provided by the convex part (a light diffusivity improvement effect as a light diffusion agent, a blocking resistance improvement effect as an anti-blocking agent, and a conductive connection stability improvement effect as a substrate of a conductive microparticle) are more certainly exhibited. Therefore, the average height of the convex part is more preferably not less than 0.10 μm, and still more preferably not less than 0.12 μm. As the average height of the convex part decreases, the convex part is more resistant to the detachment. Therefore, the average height of the convex part is more preferably not more than 5.0 μm, still more preferably not more than 4.5 μm, and yet still more preferably not more than 4.0 μm.

In the resin particle, the average base diameter of the convex part is preferably not less than 0.10 μm and not more than 10 μm. The average base diameter is more preferably not less than 0.12 μm, and still more preferably not less than 0.15 μm. As the average base diameter of the convex part increases, the contact area between the spherical part and the convex part increases, and the detachment of the convex part tend to be suppressed. As the average base diameter of the convex part decreases, effects provided by the convex part (a light diffusivity improvement effect, a blocking resistance improvement effect, and a connection stability improvement effect) can be more effectively exhibited even when the particle diameter of the resin particle decreases. Therefore, the average base diameter is more preferably not more than 9.0 μm, and still more preferably not more than 8.0 μm.

In the resin particle, the ratio (height/base diameter) between the average height and average base diameter of the convex part is preferably not less than 0.10 and not more than 0.80. As the ratio (height/base diameter) increases, effects provided by the convex part (a light diffusivity improvement effect, a blocking resistance improvement effect, and a connection stability improvement effect) can be exhibited more effectively. Therefore, the ratio is more preferably not less than 0.15, and still more preferably not less than 0.20. When the ratio (height/base diameter) decreases, the detachment of a protrusion is further suppressed. Therefore, the ratio is more preferably not more than 0.70, and still more preferably not more than 0.60.

Furthermore, in the resin particle, the ratio between the average height of the convex part and the volume average particle diameter of the resin particle (average height of convex part/volume average particle diameter) is preferably not less than 0.001 and not more than 0.20. As the ratio (average height of convex part/volume average particle diameter) increases, effects provided by the convex part (a light diffusivity improvement effect, a blocking resistance improvement effect, and a connection stability improvement effect) can be exhibited more effectively. Therefore, the ratio is more preferably not less than 0.003, and still more preferably not less than 0.005. When the ratio (average height of convex part/volume average particle diameter) decreases, the detachment of the protrusion is further suppressed. Therefore, the ratio is more preferably not more than 0.19, and still more preferably not more than 0.18.

The average height and average base diameter of the convex part can be measured based on a scanning electron microscope photograph obtained at a magnification ratio of not less than 10,000. In the particular measurement, the resin particle is photographed at a magnification ratio of not less than 10,000 with a scanning electron microscope, and in the obtained scanning electron microscope photograph, a triangle (4) is drawn in which settled as a base is a line segment connecting two starting points (6a, 6b) of the convex part (3) existing in the peripheral part (2a) of the resin particle, and settled as an apex is a top part (8) of the convex part (3) as shown in FIGS. 2A and 2B, and a base (5) of the triangle (4) is defined as the base of the convex part (3), and the height of the triangle (4) is defined as the height of the convex part (3). Further, the heights and base diameters of 50 or more convex parts of the resin particle are measured by the method, and averaged to respectively provide the average height and average base diameter of the convex parts of each resin particle.

In the resin particle, the number of the convex part per one resin particle is preferably not less than 5 and not more than 5000. As the number of the convex part per one resin particle increases, the distribution density of the convex parts is more uniform, and effects provided by the convex part (a light diffusivity improvement effect, a blocking resistance improvement effect, and a connection stability improvement effect) can be exhibited more effectively. Therefore, the number is more preferably not less than 7, and still more preferably not less than 10. As the number of the convex part per one resin particle decreases, the contact area between the convex part and the spherical part increases, and it further suppresses the detachment of the convex part. Therefore, the number is more preferably not more than 4000, and still more preferably not more than 3500.

The number of the convex part per one resin particle can be measured based on a scanning electron microscope photograph obtained at a magnification ratio of not less than 3000. In the particular measurement, the number of the convex part per one resin particle can be measured as the number that is twice of the number of the convex parts which exist on the viewing screen side of the scanning electron microscope photograph per one resin particle, and the average of the numbers of the convex parts of five resin particles measured by the method is defined as the number of the convex part per one resin particle.

According to the present invention, it is also possible to uniform the number of the convex part per one resin particle. The variation coefficient of the number of the convex part per one resin particle is, for example, not more than 20%, preferably not more than 18%, and still more preferably not more than 15%, and it provides suppressed variation between the resin particles and uniform the performance of the conductive microparticle. The variation coefficient is usually preferably not less than 0.1%, more preferably not less than 1%, and still more preferably not less than 2%.

Further, the present invention provides uniform formation of the convex parts on the surface of the resin particle without bias and uniform the performance of the conductive microparticle. In the particular evaluation, the resin particle is divided in the scanning electron microscope image of the resin particle (for example, a magnification ratio of not less than 3000) into four divisions by drawing two straight lines that pass through the center of the resin particle and are normal to each other at the center of the particle, and the standard deviation of the number of the convex part per one division of one resin particle is calculated. When the standard deviation divided by the number of the convex part per one resin particle, the average value thereof is, for example, not more than 10%, preferably not more than 8%, and more preferably not more than 7%. The average value is usually preferably not less than 0.01%, more preferably not less than 0.1%, and still more preferably not less than 0.2%.

In the resin particle, the number density of the convex parts is preferably not less than $0.01/\mu m^2$ and not more than $10/\mu m^2$. As the number density of the convex parts increases, the distribution of the convex parts is more uniform, and effects provided by the convex part (a light diffusivity improvement effect, a blocking resistance improvement effect, and a connection stability improvement effect) can be exhibited more effectively. Therefore, the number density is more preferably not less than $0.015/\mu m^2$, and still more preferably not less than $0.02/\mu m^2$. As the number density of the convex parts decreases, the contact area between the convex part and the spherical part increases, and it further suppresses the detachment of the convex part. Therefore, the number density is more preferably not more than $8.0/\mu m^2$, and still more preferably not more than $7.0/\mu m^2$. The number density of the convex parts represents the number of the convex part that exist per 1 $\mu m^2$ area of the spherical part or peripheral layer.

The number density of the convex parts on the resin particle can be calculated based on the radius of the spherical part or the total of the spherical part radius and the peripheral layer thickness, and the number of the convex part per one resin particle. In the particular calculation, the spherical part diameter or the diameter including the spherical part and the peripheral layer is calculated using a scanning electron microscope photograph obtained at a magnification ratio of not less than 10,000 and a caliper diameter calculation tool provided with the device. The number of the convex part per one resin particle can be divided by the surface area of the spherical part (4×π×square of radius of spherical part) or the surface area of the peripheral layer (4×π×square of (total of radius of spherical part and thickness of peripheral layer)), to calculate the number density.

The convex part preferably has a contact angle (a contact angle with respect to the peripheral layer or the spherical part when the convex part is assumed to be a droplet) of not more than 90 degrees on average, for example. As the contact angle decreases, the protrusion is further more resistant to the detachment. Therefore, the contact angle is more preferably not more than 85 degrees, still more preferably not more than 80 degrees, and particularly preferably not more than 70 degrees. The lower limit of the contact angle is not particularly limited, while as the contact angle increases the height of the convex part can increase and the effects provided by the convex part (a light diffusivity improvement effect, a blocking resistance improvement effect, and a connection stability improvement effect) can be exhibited more effectively, and therefore the contact angle is preferably, for example, not less than 5 degrees, more preferably not less than 10 degrees, and still more preferably not less than 15 degrees. As the contact angle increases, the conductive connection stability improvement effect provided by the convex part can be more effectively exhibited in the use as the substrate of the conductive microparticle, and therefore the contact angle is preferably not less than 30 degrees, more preferably not less than 35 degrees, and still more preferably not less than 45 degrees.

The contact angle, from the assumption that the convex part were a droplet with respect to the peripheral layer or the spherical part, can be defined as the angle between the tangent of the peripheral layer or spherical part and the tangent of the convex part at the starting point of the convex part. The contact angle can be measured based on a transmission electron microscope photograph obtained at a magnification ratio of not less than 10,000. In the particular measurement, the resin particle cross-section is photographed at a magnification ratio of not less than 10,000 with a transmission electron microscope, and an angle (θ) between a tangent (9a) with respect to the surface of the peripheral part (the spherical part when the peripheral layer cannot be confirmed in the transmission electron microscope photograph) passing through one starting point (6a) of the convex part (3) based on the obtained transmission electron microscope photograph; and a tangent (9b) with respect to the convex part passing through the starting point (6a) is defined as a contact angle (FIGS. 3A, 3B). Furthermore, the average of the contact angles of 10 or more convex parts of one kind of resin particle measured by the method is defined as the contact angle of each resin particle.

The peripheral part may comprise a convex part and a peripheral layer. When the peripheral part comprises peripheral layer, the peripheral layer thickness is not particularly limited, and is preferably, for example, not more than 5 μm, more preferably not more than 3 μm, and still more preferably not more than 1 μm from transmission electron microscope observation. The lower limit of the peripheral layer thickness may be preferably 0 μm.

The thickness of the peripheral part is preferably not more than 10 μm, more preferably not more than 9 μm, and still more preferably not more than 8 μm, given that the thickness of the peripheral part is defined as the total of the average height of the convex part and the peripheral layer thickness in the peripheral part. The thickness of the peripheral part is preferably not less than 0.10 μm, more preferably not less than 0.11 μm, and still more preferably not less than 0.12 μm.

Furthermore, the ratio between the average height of the convex part and the peripheral part thickness (the average height of the convex part/the peripheral part thickness) is preferably, for example, not less than 0.5, more preferably not less than 0.7, still more preferably not less than 0.8, and particularly preferably not less than 0.9. The maximum value of the ratio (the average height of the convex part/the peripheral part thickness) may be preferably 1.

The ratio between the peripheral part thickness and the volume average particle diameter of the resin particle (the peripheral part thickness/the volume average particle diameter) is preferably not less than 0.001, more preferably not less than 0.005, and still more preferably not less than 0.01. The ratio (the peripheral part thickness/the volume average particle diameter) is preferably not more than 0.40, more preferably not more than 0.38, and still more preferably not more than 0.36.

In the resin particle, the melting point of the peripheral part is not less than 200° C. The hardness of the convex part at room temperature (25° C.) can be improved thereby. The melting point of the peripheral part is preferably not less than 220° C., more preferably not less than 240° C., and still more preferably not less than 250° C. The upper limit of the melting point is not particularly limited, and is 400° C., for example. The melting point of the peripheral part can be measured as a temperature at which the peripheral part deforms by heating.

The peripheral part in the resin particle is made of a vinyl polymer and/or a polysiloxane component, and the melting points of the vinyl polymer and/or polysiloxane component contained in the peripheral part are each preferably not less than 200° C. because the melting point of the peripheral part may be easily set to 250° C. and the hardness of the convex part at room temperature (25° C.) is allowed to improve. The melting point of the component (the vinyl polymer and/or the polysiloxane component) contained in the peripheral part is more preferably not less than 220° C., still more preferably not less than 240° C., and yet still more preferably not less than 250° C. The upper limit of the melting point is not particularly limited, and is 400° C., for example.

It is preferable that the resin particle has a core-shell structure comprising a core and a shell; the core comprises a spherical part; and the shell comprises a peripheral part that has a convex part. The peripheral part having the convex part is particularly preferably comprise only a shell. Examples of the resin particle include a resin particle in which a spherical part comprises only a core and a peripheral that has a convex part comprises only a shell, and a resin particle in which a spherical part comprises a core and a part of a shell, and a peripheral part that has a convex part comprises only a shell.

The resin particle has a volume average particle diameter of, preferably not less than 1 μm and not more than 50 μm, more preferably not less than 1.5 μm and not more than 40 μm, still more preferably not less than 2 μm and not more than 35 μm, and particularly preferably not less than 2.5 μm and not more than 30 μm. When the volume average particle diameter of the resin particle is within the above-mentioned range, the resin particle can be suitably used for resin additives (an anti-blocking agent and a light diffusion agent), delustering agents, toner additives, powder paints, water-dispersed paints, decoration boards additives, artificial marble stone additives, cosmetics fillers, chromatographic column packings, and substrates of conductive microparticles. Herein, the "volume average particle diameter" in the present invention is measured by a precision particle diameter distribution measuring device based on the Coulter Principle (for example, COULTER MULTISIZER III TYPE (trade name) (manufactured by Beckman Coulter, Inc.).

The transmission electron microscope is known to irradiate an electron beam on a sample to detect transmitted or scattered light. When a bright-field signal (a transmitted signal from a scattering angle with a range including 0) is detected among these, the difference between sparseness and denseness in the sample is represented by the contrast difference. When a dark-field signal (a transmitted signal from a scattering angle with a scattering angle range excluding 0 (larger than the bright-field signal)) is detected, the difference between the atomic weights of contained elements is represented by the contrast difference. In the present invention, a transmission electron microscopy for detecting the dark-field signal is preferable. When the dark-field signal is detected, the difference of the atomic weight between an element contained in a specific region and an element contained in the surrounding region thereof causes the contrast difference, and it allows the observation of the boundary. In the transmission electron microscope photograph, the lightness is shown to decrease with the increase of the atomic weight, and a region containing an element having a comparatively high atomic weight such as silicon, phosphorus, or sulfur is darker, and a region containing only an element having a comparatively low atomic weight such as hydrogen, carbon, or oxygen is more brightly represented. As a matter of course, the lightness may be shown to increase as the atomic weight increases as long as the boundary may be observed which derives from the atomic weights difference of the elements. The same cross-section image may be obtained with a scanning transmission electron used in place of the transmission electron microscope.

2. Construction Material of Resin Particle

The resin particle is preferably made of a vinyl polymer and/or a polysiloxane component, and more preferably made of a vinyl polymer and a polysiloxane component. In the present invention, the vinyl polymer represents a polymer having a vinyl polymer skeleton, and is formed by polymerization (preferably, radical polymerization) of a vinyl monomer (vinyl group-containing monomer). The polysiloxane component (also referred to as a polysiloxane skeleton) represents a component having a siloxane bond (Si—O—Si), and is formed by polymerization of a silane monomer. The polysiloxane component is preferably a polysiloxane component formed using a silane crosslinkable monomer (preferably, a silane crosslinkable monomer in a third form, and more preferably a silane monomer having a vinyl group).

In the resin particle, each of the spherical part and peripheral part is made of a vinyl polymer and/or a polysiloxane component, and the spherical part has a composition different from that of the peripheral part.

Herein, the compositions of the spherical part and the peripheral part are expressed by the kinds and mass percentages of monomers to form the spherical part and the peripheral part. Similarly, the compositions of the vinyl polymer and polysiloxane component are expressed by the kinds and mass percentages of monomers to form the vinyl polymer and the polysiloxane component. Therefore, the term that "the spherical part has a composition different from that of the peripheral part" means that the kinds and mass percentages are different between the monomers forming the spherical part and those forming the peripheral part. Examples thereof include an embodiment where the composition of at least one of the vinyl polymer and polysiloxane component contained is different between the spherical and peripheral parts, such as a case where the vinyl polymer contained in the peripheral part has a different composition from that of the vinyl polymer contained in the spherical part and a case where a polysiloxane component contained in the spherical part has a different composition from that of a polysiloxane component contained in the peripheral part; an embodiment where the content (mass percentage in the spherical or peripheral part) of at least one of the vinyl polymer and polysiloxane component is different between the spherical and peripheral parts; and an embodiment where a third component composition or content (mass percentage in the spherical or peripheral part) other than a vinyl polymer and polysiloxane component is different between the spherical and peripheral parts. Preferred among them are an embodiment where the composition of at least one of the vinyl polymer and polysiloxane component is different between the spherical and peripheral parts; and an embodiment where the content (mass content in the spherical or peripheral part) of at least one of the vinyl polymer and polysiloxane component is different between the spherical and peripheral parts. In the case where the compositions of the vinyl polymer and polysiloxane component are different, a case is also included where any one of the spherical and peripheral parts does not contain the vinyl polymer or the polysiloxane component.

Similarly, a core part contained in the spherical part preferably has a different composition from that of a shell part containing the peripheral part (convex part). Preferred examples thereof include an embodiment where a vinyl polymer or polysiloxane component contained in a core part has a different composition from that of a vinyl polymer or polysiloxane component contained in a shell part; and an embodiment where the content (mass percentage) of at least any one of a vinyl polymer and polysiloxane component is different between a core and a shell part.

The sizes (height and base diameter) of the convex part and the dispersed density of the convex part can thereby be adjusted.

The component forming the spherical part preferably contains at least a vinyl polymer, and more preferably contains a vinyl polymer and a polysiloxane component. The component forming the peripheral part preferably contains at least a polysiloxane component, and more preferably contains a vinyl polymer and a polysiloxane component.

Similarly, the component forming the core part preferably contains at least a vinyl polymer, and more preferably contains a vinyl polymer and a polysiloxane component. The component forming the shell part preferably contains at least a polysiloxane component, and more preferably a vinyl polymer and a polysiloxane component.

In the present invention, examples of a "vinyl group" include a substituent group having not only a carbon-carbon double bond (ethenyl group) but also a substituent group comprising a functional group and a polymerizable carbon-carbon double bond such as (meth)acryloxy group, allyl group, isopropenyl group, vinyl phenyl group, or isopropenyl phenyl group. In the present specification, "(meth) acryloxy group", "(meth)acrylate", and "(meth)acrylic" respectively represent "acryloxy group and/or methacryloxy group", "acrylate and/or methacrylate", and "acrylic and/or methacryl".

Hereinafter, monomer components is firstly described in general as raw materials to form the resin particle.

The vinyl monomer forming the vinyl polymer is classified into a vinyl crosslinkable monomer and a vinyl non-crosslinkable monomer.

The vinyl crosslinkable monomer has a vinyl group, and is capable of forming a crosslinked structure. Specific examples thereof include a monomer having two or more vinyl groups in one molecule (monomer (1)), or a monomer having a vinyl group and a binding functional group (a protonic hydrogen-containing group such as carboxy group or hydroxy group and a terminal functional group such as an alkoxy group) other than the vinyl group in one molecule (monomer (2)). In order to form a crosslinked structure with the monomer (2), the presence of the counter monomer is required that can react with (be bonded to) the binding functional group other than the vinyl group of the monomer (2).

Among the vinyl crosslinkable monomers, examples of the monomer (1) (the monomer having two or more vinyl groups in one molecule) include: allyl(meth)acrylates such as allyl(meth)acrylate; di(meth)acrylates such as alkane diol di(meth)acrylate, (for example, ethylene glycol di(meth) acrylate, 1,4-butanediol di(meth)acrylate, 1,6-hexanediol di(meth)acrylate, 1,9-nonanediol di(meth)acrylate, 1,10-decanediol di(meth)acrylate, 1,3-butylene di(meth)acrylate), polyalkylene glycol di(meth)acrylate (for example, diethylene glycol di(meth)acrylate, triethylene glycol di(meth) acrylate, decamethylene glycol di(meth)acrylate, pentadecaethylene glycol di(meth)acrylate, pentacontahecta ethylene glycol di(meth)acrylate, polyethylene glycol di(meth)acrylate, polypropyleneglycol di(meth)acrylate, and polytetramethylene glycol di(meth)acrylate; tri(meth)acrylates such as trimethylolpropanetri(meth)acrylate; tetra(meth)acrylates such as pentaerythritol tetra(meth)acrylate; hexa(meth)acrylates such as dipentaerythritol hexa(meth)acrylate; aromatic hydrocarbon-based crosslinking agents such as divinylbenzene, divinylnaphthalene, and derivatives thereof (preferably, styrene-based polyfunctional monomers such as divinylbenzene); and hetero atom-containing crosslinking agents such as N,N-divinyl aniline, divinyl ether, divinyl sulfide, and divinyl sulfonic acid. Among these, (meth) acrylates having two or more (meth)acryloyl groups in one molecule (polyfunctional (meth)acrylate) and an aromatic hydrocarbon-based crosslinking agent (particularly, styrene-based polyfunctional monomer) are preferable. Among the (meth)acrylates having two or more (meth)acryloyl groups in one molecule, the (meth)acrylates having two (meth) acryloyl groups in one molecule are particularly preferable. (Meth)acrylates having three or more (meth)acryloyl groups in one molecule are particularly preferable. Furthermore, among these, acrylates having three or more acryloyl groups in one molecule are preferable. In the styrene-based polyfunctional monomers, a monomer having two vinyl groups in one molecule such as divinylbenzene is preferable. The monomers (1) may be used alone or in combinations of two or more.

Among the vinyl crosslinkable monomers, examples of the monomer (2) (the monomer having a vinyl group and a binding functional group other than the vinyl group in one molecule) include: monomers having a carboxy group such as (meth)acrylic acid; hydroxy group-containing (meth) acrylates such as 2-hydroxyethyl(meth)acrylate, 2-hydroxypropyl(meth)acrylate, and 2-hydroxybutyl(meth)acrylate; monomers having hydroxy group such as hydroxy group-containing styrenes (such as p-hydroxystyrene); alkoxy group-containing (meth)acrylates such as 2-methoxyethyl (meth)acrylate, 3-methoxybutyl(meth)acrylate, and 2-butoxyethyl(meth)acrylate; and monomers having an alkoxy group such as alkoxy styrenes (such as p-methoxy styrene). The monomers (2) may be used alone or in combinations of two or more.

Examples of the vinyl non-crosslinkable monomer include the monomer having a vinyl group in one molecule (monomer (3)) or the monomer (2) (the monomer having a vinyl group and a binding functional group other than the vinyl group in one molecule) when the other party monomer does not exist.

Among the vinyl non-crosslinkable monomers, the monomer (3) (the monomer having a vinyl group in one molecule)

contains a (meth)acrylate-based monofunctional monomer and a styrene-based monofunctional monomer. Examples of the (meth)acrylate-based monofunctional monomer include: alkyl (meth)acrylates such as methyl (meth)acrylate, ethyl (meth)acrylate, propyl (meth)acrylate, n-butyl (meth)acrylate, isobutyl (meth)acrylate, pentyl (meth)acrylate, hexyl (meth)acrylate, heptyl (meth)acrylate, octyl (meth)acrylate, nonyl (meth)acrylate, decyl (meth)acrylate, dodecyl (meth)acrylate, stearyl (meth)acrylate, and 2-ethylhexyl (meth)acrylate; cycloalkyl (meth)acrylates such as cyclopropyl (meth)acrylate, cyclopentyl (meth)acrylate, cyclohexyl (meth)acrylate, cyclooctyl (meth)acrylate, cycloundecyl (meth)acrylate, cyclododecyl (meth)acrylate, isobornyl (meth)acrylate, and 4-t-butylcyclohexyl (meth)acrylate; and aromatic ring-containing (meth)acrylates such as phenyl (meth)acrylate, benzyl (meth) acrylate, tolyl (meth)acrylate, and phenethy (meth)acrylate. The alkyl (meth)acrylates such as methyl(meth)acrylate are preferable. Examples of the styrene-based monofunctional monomer include: styrene; alkyl styrenes such as o-methylstyrene, m-methylstyrene, p-methylstyrene, α-methylstyrene, and p-t-butylstyrene, and halogen group-containing styrenes such as o-chlorostyrene, m-chlorostyrene, and p-chlorostyrene, and styrene is preferable. The monomers (3) may be used alone or in combinations of two or more.

The vinyl monomer contains at least the vinyl crosslinkable monomer (1) as a preferable embodiment. Above all, the vinyl monomer contains the vinyl crosslinkable monomer (1) and the vinyl non-crosslinkable monomer (3) (particularly, a copolymer of the monomer (1) and monomer (3)) as a more preferable embodiment.

The resin particle contains, preferably not less than 20% by mass of a vinyl polymer, more preferably not less than 30% by mass, still more preferably not less than 50% by mass, yet still more preferably not less than 60% by mass, and particularly preferably not less than 70% by mass in 100% by mass of the resin particle. The upper limit of the content percentage of the vinyl polymer is 100% by mass.

The polysiloxane component can be formed by using a silane monomer, and the silane monomer is classified into a silane crosslinkable monomer and a silane non-crosslinkable monomer. When the silane crosslinkable monomer is used as the silane monomer, a crosslinked structure can be formed. Examples of the crosslinked structure formed by the silane crosslinkable monomer include: a crosslinked structure obtained by the crosslinking of a vinyl polymer skeleton and vinyl polymer skeleton (first form); a crosslinked structure obtained by the crosslinking of a polysiloxane skeleton and polysiloxane skeleton (second form); and a crosslinked structure obtained by the crosslinking of a vinyl polymer skeleton and polysiloxane skeleton (third form).

Examples of the silane crosslinkable monomer that can form the first form (crosslinking between vinyl polymers) include a silane compound having two or more vinyl groups such as dimethyldivinylsilane, methyltri vinylsilane, and tetravinylsilane.

Examples of the silane crosslinkable monomer that can form the second form (crosslinking between polysiloxanes) include tetrafunctional silane monomers such as tetramethoxysilane, tetraethoxysilane, tetraisopropoxysilane, and tetrabutoxysilane; and trifunctional silane monomers such as methyltrimetoxysilane, methyltriethoxysilane, ethyltrimethoxysilane, and ethyltriethoxysilane.

Examples of the silane crosslinkable monomer that can form the third form (crosslinking between vinyl polymer and polysiloxane) include: di- or tri-alkoxysilanes having a (meth)acryloyl group such as 3-methacryloxypropyltrimethoxysilane, 3-methacryloxypropyltriethoxysilane, 3-acryloxypropyltrimethoxysilane, 3-methacryloxypropylmethyldimethoxysilane, 3-methacryloxypropylmethyldiethoxysilane, 3-acryloxypropyltriethoxysilane, and 3-methacryloxyethoxypropyltrimethoxysilane; di- or tri-alkoxysilanes having vinyl group (ethenyl group) such as vinyltrimetoxysilane, vinyltriethoxysilane, and p-styryltrimethoxysilane; di- or tri-alkoxysilanes having an epoxy group such as 3-glycidoxypropyltrimetoxysilane, 3-glycidoxypropyltriethoxysilane, and 2-(3, 4-epoxycyclohexyl) ethyltrimethoxysilane; and di- or tri-alkoxysilanes having an amino group such as 3-aminopropyltrimethoxysilane and 3-aminopropyltriethoxysilane. These silane crosslinkable monomers may be used alone or in combinations of two or more.

Examples of the silane non-crosslinkable monomer include: difunctional silane monomers such as dialkylsilanes (such as dimethyldimethoxysilane and dimethyldiethoxysilane); and monofunctional silane monomers such as trialkylsilanes (such as trimethylmethoxysilane and trimethylethoxysilane). These silane non-crosslinkable monomers may be used alone or in combinations of two or more.

Particularly, the polysiloxane skeleton is preferably a skeleton derived from polymerizable polysiloxane having a radically polymerizable vinyl group (for example, a vinyl group such as a carbon-carbon double bond or a (meth) acryloyl group). That is, the polysiloxane skeleton is preferably formed by hydrolyzing and condensing a silane crosslinkable monomer that can form at least the third form (crosslinking between vinyl polymer and polysiloxane) as a structural component (preferably, a silane crosslinkable monomer having a vinyl group, more preferably a silane crosslinkable monomer having vinyl group (ethenyl group) or (meth)acryloyl group, and still more preferably 3-methacryloxypropyltrimethoxysilane, 3-methacryloxypropylmethyldimethoxysilane, and vinyltrimetoxysilane).

When the polysiloxane component is introduced into the resin particle, the use amount of the vinyl monomer is preferably not less than 1 part by mass, more preferably not less than 5 parts by mass, and still more preferably not less than 10 parts by mass based on 100 parts by mass of the silane monomer. The used amount of the vinyl monomer is preferably not more than 5000 parts by mass, more preferably not more than 4000 parts by mass, and still more preferably not more than 3000 parts by mass.

A monomer component that forms the resin particle preferably contains a crosslinkable monomer such as a vinyl crosslinkable monomer or a silane crosslinkable monomer. In this case, the percentage of the crosslinkable monomer (the total of the vinyl crosslinkable monomer and silane crosslinkable monomer) contained in the whole monomer that forms the vinyl polymer particle is preferably not less than 1% by mass, more preferably not less than 2% by mass, and still more preferably not less than 5% by mass from the viewpoints of excellent light diffusivity, elastic deformation, and restoring force. The light diffusivity and the restoring force can be improved while excellent elastic deformation characteristics are maintained when the percentage of the crosslinkable monomer is within the above range in the resin particle. The upper limit of the percentage of the crosslinkable monomer is not particularly limited, however, the resin particle may become hard and becomes unsuitable for the elastic deformation as the percentage of the crosslinkable monomer is excessive depending on the kind of the crosslinkable monomer to be used, and therefore the percentage of the crosslinkable monomer is preferably not more than 97% by mass, more preferably not more than 95% by mass, still more preferably not more than 93% by mass, yet still more preferably not more than 90% by mass, and particularly preferably not more than 85% by mass.

The resin particle may contain other components to the extent that the characteristics of the vinyl polymer and/or polysiloxane component are not deteriorated. In this case, the resin particle preferably contains not less than 85% by mass of a vinyl polymer and/or polysiloxane component, more preferably not less than 95% by mass, and still more preferably not less than 98% by mass.

3. Process for Producing Resin Particle

The resin particle of the present invention can be produced by a process including:

step (a): a step of polymerizing a core monomer composition comprising a vinyl monomer and/or a silane monomer as a polymerization component to form a core particle; and step (b): a step of covering the surface of the core particle to form a shell with a silane monomer composition containing a silane monomer as a polymerization component, thereby obtaining a resin particle 1.

The process preferably further comprises:

step (c): a step of subjecting the resin particle 1 obtained in the step (b) to absorb a shell vinyl monomer composition comprising a vinyl monomer as a polymerization component, and thereafter polymerizing the shell vinyl monomer composition to obtain a resin particle 2.

3-1. Step (a): Core Particle Forming Step

In the step (a), the core of the resin particle can be produced by polymerizing the core monomer composition containing the above monomer as a polymerization component. The mechanical and optical properties of the resin particle can be adjusted with the monomer used for the core monomer composition. The "monomer composition" means a composition containing only a monomer.

The core monomer composition is usually polymerized in a state where a catalyst component such as a polymerization initiator is made to coexist with the composition.

The core monomer composition preferably contains a vinyl monomer (hereinafter, referred to as a "core vinyl monomer") and/or a silane monomer (hereinafter, referred to as a "core silane monomer") selected from the above mentioned monomers. The core monomer composition preferably contains at least a core vinyl monomer. The core vinyl monomer can be selected from the monomer (1) having two or more vinyl groups, monomer (2) containing a vinyl group and the other functional group, and monomer (3) having a vinyl group, among the vinyl monomers exemplified above. The vinyl monomers may be used alone or in combinations of two or more, and the vinyl monomers are preferably used in combinations of two or more from the viewpoint of adjusting mechanical and optical properties.

Preferred examples of the monomer (1) having two or more vinyl groups include di(meth)acrylates and aromatic hydrocarbon-based crosslinking agents. Preferred examples of the monomer (3) having a vinyl group include alkyl (meth)acrylates, cycloalkyl methacrylates, and styrene-based monofunctional monomers.

The core monomer composition preferably contains a monomer (2) containing a vinyl group and the other functional group as a core vinyl monomer, and preferably a monomer having a hydrophilic group such as carboxy group, hydroxy group, amino group, or thiol group, and a vinyl group among the monomer (2). This facilitates the adjustment of a solubility parameter to be described later, and the formation of the convex part becomes more probable.

When the core monomer composition contains the core silane monomer, the percentage of the core vinyl monomer in the total of 100% by mass of the core vinyl monomer and core silane monomer is preferably not less than 10% by mass, more preferably not less than 20% by mass, still more preferably not less than 30% by mass, yet still more preferably not less than 60% by mass, even more preferably not less than 70% by mass, and particularly preferably not less than 80% by mass. The upper limit is 100% by mass. When the core monomer composition contains the core silane monomer, the content of the core vinyl monomer is preferably not less than 0.3 parts by mass, more preferably not less than 0.5 parts by mass, still more preferably not less than 2 parts by mass, yet still more preferably not less than 3 parts by mass, and even more preferably not less than 4 parts by mass based on 1 part by mass of the core silane monomer. The content is preferably not more than 50 parts by mass, more preferably not more than 40 parts by mass, and still more preferably not more than 30 parts by mass based on 1 part by mass of the core silane monomer.

Furthermore, the percentage of the core vinyl monomer is preferably less than 60% by mass, and more preferably not more than 55% by mass in the total of 100% by mass of the core vinyl monomer and core silane monomer. The percentage is preferably not less than 10% by mass, and more preferably not less than 20% by mass. Furthermore, the amount of the core vinyl monomer is preferably less than 2 parts by mass, more preferably not more than 1.5 parts by mass, and still more preferably not more than 1.2 parts by mass based on 1 part by mass of the core silane monomer. The amount is preferably not less than 0.3 parts by mass, and more preferably not less than 0.5 parts by mass.

When the percentage of the core vinyl monomer is within the range, a core particle having a smaller particle diameter is particularly likely to be obtained.

As the core silane monomer, the silane crosslinkable monomer can be preferably used, and the silane crosslinkable monomer (third form) that can form an organic polymer skeleton and a polysiloxane skeleton can be more preferably used.

The core monomer composition may contain a monomer other than the core vinyl monomer and the core silane monomer, and preferably mainly contains the core vinyl monomer, or the core vinyl monomer and the core silane monomer. Specifically, the mass percentage of the total of the core vinyl monomer and core silane monomer is preferably not less than 80% by mass, more preferably not less than 90% by mass, still more preferably not less than 98% by mass, and particularly preferably 100% by mass in 100% by mass of the core monomer composition.

The core monomer composition preferably has a solubility parameter of not less than 8 $(cal/cm^3)^{1/2}$, and a solubility parameter of not more than 11 $(cal/cm^3)^{1/2}$. The solubility parameter of the core monomer composition is more preferably not less than 8.5 $(cal/cm^3)^{1/2}$, still more preferably not less than 8.9 $(cal/cm^3)^{1/2}$, and particularly preferably not less than 9.1 $(cal/cm^3)^{1/2}$. The solubility parameter of the core monomer composition is more preferably not more than 10.5 $(cal/cm^3)^{1/2}$, and still more preferably not more than 10 $(cal/cm^3)^{1/2}$. The hydrophilicity of the core monomer composition improves as the solubility parameter increases, and the hydrophobicity of the core monomer composition improves as the solubility parameter decreases.

In the present invention, the solubility parameter represents a solubility parameter calculated by the Fedors' method. By using the Fedors' method, the solubility parameter of the monomer can be directly calculated. The solubility parameter of the monomer composition containing a plurality of monomer can be calculated by summating each of the product of the solubility parameter and mass percentage in the composition for each monomer contained in the monomer composition and. The Fedors' method is described in detail in Polymer Engineering and Science, 1974, vol. 14, p. 147 to 154.

In the step (a), a method for polymerizing the core monomer composition is preferably (i) a method including polymerizing a core vinyl monomer and/or a silane monomer according to conventionally known aqueous suspension polymerization, dispersion polymerization, and emulsification polymerization; (ii) a method including obtaining vinyl group-containing polysiloxane using a core silane monomer and thereafter polymerizing (radically polymerizing) the vinyl group-containing polysiloxane and the core vinyl monomer; and (iii) a so-called seed polymerization method including subjecting a seed particle to absorb a core vinyl monomer and polymerizing (preferably, radical polymerizing).

In any of the methods (i) to (iii), a catalyst for a polymerization reaction such as a polymerization initiator is preferably mixed with the core monomer composition to uniformly disperse or dissolve the polymerization initiator in the composition. In the production methods (i) to (iii), a surfactant may be used and the use amount thereof is preferably within the range of 0.1 to 5 parts by mass based on the total of 100 parts by mass of the core monomer composition. The surfactant used in the step (a) can be removed by washing the obtained core particle with ion exchange water and an organic solvent such as methanol.

From the viewpoint of uniforming the core particles diameter, the production methods (ii) and (iii) are preferable, and the production method (i) is preferable from the viewpoint of industrial advantage. The method for forming the core particle can be appropriately selected according to its intended use.

In the production method (i), the above mentioned vinyl monomer can be used without particular limitation as the core vinyl monomer. The core silane monomer is preferably the silane crosslinkable monomer, and more preferably the silane crosslinkable monomer having two or more vinyl groups (the first form) and the silane crosslinkable monomer having a vinyl group such as di- or tri-alkoxysilane having a vinyl group (the third form). In the aqueous suspension polymerization as a specific example of the production method (i), a core is obtained by suspending a composition obtained by mixing a core monomer composition with a (radical) polymerization initiator in an aqueous medium (for example, water), and heating (usually 50 to 100° C.) while stirring.

In the production method (ii), a core particle into which a polysiloxane skeleton is introduced is obtained by using at least the silane crosslinkable monomer that can form the third form as the core silane monomer.

In the production method (iii), a polystyrene particle and polysiloxane particle that are non-crosslinked or low-crosslinked are preferably used as the seed particle to produce the core particle. When the polysiloxane particle is used for the seed particle, the polysiloxane skeleton is introduced into the vinyl polymer.

Further, in the production method (iii), the polysiloxane particle as the seed particle is preferably a particle which is obtained by subjecting the composition containing the silane crosslinkable monomer that can form the third form (crosslinking between vinyl polymer and polysiloxane) to (co) hydrolytic condensation, and particularly preferably a polysiloxane particle containing a vinyl group. When the polysiloxane particle has the vinyl group, the vinyl polymer and the polysiloxane skeleton are bonded via a silicon atom contained in polysiloxane in the obtained core particle, and it results in the improvements in not only the elastic characteristics and the restoring force but also a refractive index to provide excellent light diffusivity. For example, the vinyl group-containing polysiloxane particle as the core particle can be produced by providing the silane crosslinkable monomer (preferably, the silane monomer containing di- or tri-alkoxysilane having a vinyl group (may be a mixture)) that can form the third form (crosslinking between vinyl polymer and polysiloxane) to (co)hydrolytic condensation.

In the production method (iii), the core monomer composition means the combination of a seed particle with a core vinyl monomer absorbed in the seed particle. The solubility parameter of the core monomer composition can be calculated by summating the product of the mass percentage of the seed particle and the solubility parameter, and the product of the mass percentage of each core vinyl monomer and the solubility parameter. The solubility parameter of the seed particle represents the same as that of the monomer composition that forms the seed particle.

As a specific example of the production method (iii), for example, a core can be produced by admixing an emulsified liquid containing a core vinyl monomer while stirring to the seed particles in a state where the seed particles are dispersed in a solvent, to allow the seed particle to absorb the core vinyl monomer, and further by advancing a polymerization reaction while heating. The solvent for dispersing the seed particles is preferably water or an organic solvent mainly containing water. As the emulsified liquid containing the core vinyl monomer, an emulsified liquid obtained by emulsifying a mixture of the core vinyl monomer and polymerization initiator in water is preferably used. A heating temperature is preferably within the range of 50 to 100° C.

3-2. Step (b): Silane Monomer Covering Step

In the step (b), the surface of the core particle is covered to form a shell with the silane monomer composition containing the silane monomer as a polymerization component, and a resin particle 1 of the present invention can be obtained. The convex part is thereby appropriately formed, and the resin particle can be efficiently obtained. In particular, according to the above method, a predetermined convex part is formed with the melting point of the resin that forms the convex part of not less than 200° C.

As the silane monomer (hereinafter, referred to as a "shell silane monomer") used in the silane monomer composition of the step (b), the silane crosslinkable monomer can be preferably used. The melting point of the convex part becomes not less than 200° C. thereby, and the vinyl polymer and the polysiloxane skeleton are bonded via the silicon atom contained in polysiloxane in the obtained shell, which results in the improvements in not only the elastic characteristics and the restoring force but also a refractive index to provide excellent light diffusivity. The shell silane monomer is more preferably the silane crosslinkable monomer that can form the third form (crosslinking between vinyl polymer and polysiloxane), still more preferably the silane crosslinkable monomer having a vinyl group, and particularly preferably di- or tri-alkoxysilane having a vinyl group. The shell silane monomers may be used alone or in combinations of two or more.

When the step (c) to be described later is not performed, the silane crosslinkable monomer that can form the third form (crosslinking between vinyl polymer and polysiloxane) is preferably used as the shell silane monomer.

The solubility parameter of the shell silane monomer composition is preferably not less than 6 $(cal/cm^3)^{1/2}$ and not more than 10 $(cal/cm^3)^{1/2}$. The solubility parameter of the shell silane monomer composition is more preferably not less than 6.5 $(cal/cm^3)^{1/2}$, and still more preferably not less than 7 $(cal/cm^3)^{1/2}$. The solubility parameter of the shell silane monomer composition is more preferably not more than 9.5 $(cal/cm^3)^{1/2}$, and still more preferably not more than 9 $(cal/cm^3)^{1/2}$. The hydrophilicity of the shell silane monomer composition improves as the solubility parameter increases, and the hydrophobicity of the shell silane monomer composition improves as the solubility parameter decreases.

The shell silane monomer preferably has different hydrophilicity or hydrophobicity from those of the core monomer composition in order to facilitate the formation of the convex part. From such a viewpoint, the absolute value of the difference ΔSP between the solubility parameters of the core monomer composition and shell silane monomer composition is preferably not less than 0.35 $(cal/cm^3)^{1/2}$. As the absolute value of the difference between the solubility parameters increases, the difference of hydrophilicity-hydrophobicity increases, and the convex part becomes further likely to form. For this reason, the absolute value of the difference between the solubility parameters of the core monomer composition and shell silane monomer composition is preferably not less than 0.4 $(cal/cm^3)^{1/2}$, and more preferably not less than 0.45 $(cal/cm^3)^{1/2}$. When the difference between the solubility parameters is excessive, the core and the shell may be separated from each other because of the difference in the hydrophilicity-hydrophobicity. Therefore, the absolute value of the difference between the solubility parameters of the core monomer composition and shell silane monomer composition is preferably not more than 10 $(cal/cm^3)^{1/2}$, more preferably not more than 5 $(cal/cm^3)^{1/2}$, and still more preferably not more than 3 $(cal/cm^3)^{1/2}$.

In the shell covering step (b), the mass ratio between the core monomer composition and the shell silane monomer composition (shell silane monomer composition/core monomer composition) is preferably not less than 0.025 and not more than 1. As the mass ratio (shell silane monomer composition/core monomer composition) increases, the size (height, base diameter) of the convex part increases, and the number per one resin particle and the number density of the convex parts decreases. The mass ratio (shell silane monomer composition/core monomer composition) may be designed according to the use of the resin particle or the intended sizes and number of the convex part, and is more preferably not less than 0.03, and still more preferably not less than 0.04. The mass ratio is more preferably not more than 0.5, and still more preferably not more than 0.1. In the case where the shell silane monomer contains two or more monomers, the solubility parameter of the shell, silane monomer can be calculated by summating the products of the solubility parameters and mass percentages of the monomers.

The method for covering the surface of the core particle to form the shell with the shell silane monomer composition is preferably a method for providing the shell silane monomer composition to (co)hydrolytic condensation on the surface of the core particle.

For example, a resin particle 1 in which a shell is formed on the core particle surface is obtained by adding and mixing under stirring the shell silane monomer composition to a liquid obtained by dispersing the core particles in a solvent containing water and a hydrolysis catalyst. The solvent for dispersing the core particles is preferably water or an organic solvent having excellent water solubility, and more preferably water, methanol, ethanol, or 2-propanol. The solvents for dispersing the core particles may be used alone or in combinations of two or more. A reaction temperature is preferably within the range of 0 to 100° C., and more preferably 10 to 50° C. By adding and mixing the shell silane monomer composition to the reaction solution in which the polymerized core particles are dispersed, a resin particle 1 on which the shell is formed on the core particle surface can be obtained.

When the step (c) to be described later is not performed and the silane crosslinkable monomer is used that has a vinyl group as the shell silane monomer, the vinyl group is preferably subjected to a polymerization reaction after the hydrolysis condensation reaction. Specifically, a reaction liquid after the hydrolysis condensation reaction may be heated (preferably, to 50 to 100° C.) under the coexistence of a polymerization initiator. This provides a resin particle 1 which contains a polysiloxane component (polysiloxane skeleton) and a vinyl polymer (skeleton), and comprises a shell layer that has crosslinking between vinyl polymer and polysiloxane (the third form).

3-3. Step (c): Vinyl Monomer Absorbing Step

In the step (c), the resin particle 1 obtained in the step (b) is allowed to absorb a shell vinyl monomer composition containing a vinyl monomer as a polymerization component, and the shell vinyl monomer composition is then polymerized, thereby a resin particle 2 of the present invention is obtained.

A vinyl monomer (hereinafter, a "shell vinyl monomer") used for the shell vinyl monomer composition can be selected from the vinyl monomers exemplified above. Specifically, the shell vinyl monomer can be preferably selected from the monomer (1) having two or more vinyl groups, the monomer (2) having a vinyl group and a binding functional group other than the vinyl group, and the monomer (3) having a vinyl group. The shell vinyl monomers may be used alone or in combinations of two or more, and two or more shell vinyl monomers are preferably used from the viewpoint of adjusting mechanical and optical properties. The monomer (1) having two or more vinyl groups is preferably di(meth)acrylates and an aromatic hydrocarbon-based crosslinking agent. The monomer (2) having a vinyl group and a binding functional group other than the vinyl group is preferably hydroxy group-containing (meth)acrylates. The monomer (3) having a vinyl group is preferably alkyl(meth)acrylates and a styrene-based monofunctional monomer.

The shell vinyl monomer composition may contain a monomer other than the shell vinyl monomer, and preferably mainly contains the shell vinyl monomer. Specifically, the mass percentage of the shell vinyl monomer in 100% by mass of the shell vinyl monomer composition is preferably not less than 80% by mass, more preferably not less than 90% by mass, still more preferably not less than 98% by mass, and particularly preferably 100% by mass.

The percentage of the vinyl crosslinkable monomer in the shell vinyl monomer composition is preferably not less than 10% by mass, and more preferably 15% by mass. As the percentage of the vinyl crosslinkable monomer increases, the contact angle of the convex part tends to increase. The upper limit of the percentage of the vinyl crosslinkable monomer is 100% by mass.

The solubility parameter of the shell vinyl monomer composition is preferably not less than 8 $(cal/cm^3)^{1/2}$ and not more than 11 $(cal/cm^3)^{1/2}$. The solubility parameter of the shell vinyl monomer composition is more preferably not less than 8.5 $(cal/cm^3)^{1/2}$, still more preferably not less than 8.9 $(cal/cm^3)^{1/2}$, and particularly preferably not less than 9.1 $(cal/cm^3)^{1/2}$. The solubility parameter of the shell vinyl monomer composition is more preferably not more than 10.5 $(cal/cm^3)^{1/2}$, and still more preferably not more than 10 $(cal/cm^3)^{1/2}$. The hydrophilicity of the shell vinyl monomer composition increases as the solubility parameter increases, and the hydrophobicity of the shell vinyl monomer composition increases as the solubility parameter decreases.

The absolute value of the difference between the solubility parameter of the shell vinyl monomer composition and the solubility parameter of the core monomer composition is preferably not less than 0.1 $(cal/cm^3)^{1/2}$. The contact angle of the convex part tends to increase as the absolute value of the difference between the solubility parameters increases.

The absolute value of the difference between the solubility parameters is preferably not more than 1.0 $(cal/cm^3)^{1/2}$, and more preferably not more than 0.9 $(cal/cm^3)^{1/2}$. The shape of the convex part is easily controlled when the absolute value of the difference between the solubility parameters of the shell vinyl monomer composition and the core monomer composition is within this range.

In the shell covering step (b), the mass ratio between the shell vinyl monomer composition and the shell silane monomer (shell vinyl monomer composition/shell silane monomer) is preferably not less than 0.05 and not more than 50. The size (height, base diameter) of the convex part increases and the number per one resin particle and the number density of the convex parts decreases as the mass ratio (shell vinyl monomer composition/shell silane monomer) increases. The mass ratio (shell vinyl monomer composition/shell silane monomer) can be designed according to the use of the resin particle, and the intended sizes and number of the convex part, and is more preferably not less than 0.1, and still more preferably not less than 0.15. The mass ratio is more preferably not more than 40, and still more preferably not more than 35.

Preferred examples of a polymerization method after the absorption of the shell vinyl monomer include radical polymerization.

As a specific example of the step (c), for example, a resin particle 2 can be produced by advancing by heating a polymerization reaction of shell vinyl monomer after mixing under stirring an emulsified liquid of a shell vinyl monomer composition to a resin particle 1 to allow the resin particle 1 to absorb the shell vinyl monomer in a state where the resin particle 1 is dispersed in a solvent. Preferred examples of a solvent for dispersing the resin particles 1 include the solvent dispersing the core particles in the step (b). An emulsified liquid obtained by emulsifying a mixture of the shell vinyl monomer composition and polymerization initiator in water is preferably used as the emulsified liquid containing the shell vinyl monomer composition. A surfactant (preferably an anionic surfactant) may be used during emulsifying, and the use amount thereof is preferably, for example, 1 to 10 parts by mass, and more preferably 1 to 5 parts by mass based on 100 parts by mass of the core vinyl monomer. A dispersing auxiliary agent may be used together, and the use amount of the dispersing auxiliary agent is preferably, for example, 0.1 to 10 parts by mass based on 100 parts by mass of the surfactant. The heating temperature is preferably within the range of 50 to 100° C.

Furthermore, the obtained resin particles may be classified, dried, and calcined if needed. A drying temperature is not particularly limited and preferably usually within the range of 50° C. to 350° C.

The resin particle of the present invention can be produced by the above production method.

4. Conductive Microparticle

The conductive microparticle of the present invention comprises the resin particle and a conductive metal layer covering the surface convex part of the resin particle along the shape of the convex part. The resin particle comprises a peripheral part having a plurality of convex part on the surface, and a spherical part surrounded by the peripheral part. The curvature center of the boundary between the peripheral and the spherical parts determined by a transmission electron microscope observation of the resin particle cross-section exists in the spherical part. This provides suppressed detachment of the convex part, and it results in the good conductive connection reliability of the conductive microparticle.

A resin particle obtained by mixing resin particles having different convex parts (height, bottom diameter, structural component, and number density) may be used as the substrate particle used for the conductive microparticle.

Examples of a metal contained in the conductive metal layer include metals and metallic compounds such as gold, silver, copper, platinum, iron, lead, aluminum, chromium, palladium, nickel, rhodium, ruthenium, antimony, bismuth, germanium, tin, cobalt, indium, nickel-phosphorus, and nickel-boron, and alloys thereof. Among these, gold, nickel, palladium, silver, copper, and tin are preferable because a conductive microparticle becomes excellent in the conductivity. From the inexpensive point, preferred are nickel, nickel alloys (Ni—Au, Ni—Pd, Ni—Pd—Au, Ni—Ag, Ni—P, Ni—B, Ni—Zn, Ni—Sn, Ni—W, Ni—Co, Ni—W, Ni—Ti); copper, copper alloys (alloys containing Cu and at least one metallic element selected from the group consisting of Fe, Co, Ni, Zn, Sn, In, Ga, Tl, Zr, W, Mo, Rh, Ru, Ir, Ag, Au, Bi, Al, Mn, Mg, P, and B, and preferably alloys containing Cu, and Ag, Ni, Sn or Zn); silver, silver alloys (alloys containing Ag and at least one metallic element selected from the group consisting of Fe, Co, Ni, Zn, Sn, In, Ga, Tl, Zr, W, Mo, Rh, Ru, Ir, Au, Bi, Al, Mn, Mg, P, and B, and preferably Ag—Ni, Ag—Sn, Ag—Zn); tin, tin alloys (for example, Sn—Ag, Sn—Cu, Sn—Cu—Ag, Sn—Zn, Sn—Sb, Sn—Bi—Ag, Sn—Bi—In, Sn—Au, and Sn—Pb) are preferable. Among these, nickel and nickel alloys are preferable. The conductive metal layer may be a single layer or a double layer and the combinations of nickel-gold, nickel-palladium, nickel-palladium-gold, and nickel-silver are preferable for the double layer, for example.

The thickness of the conductive metal layer is preferably not less than 0.01 µm, more preferably not less than 0.03 µm, and still more preferably not less than 0.05 µm. The thickness is preferably not more than 0.3 µm, more preferably not more than 0.25 µm, still more preferably not more than 0.2 µm, and yet still more preferably not more than 0.15 µm. When the thickness of the conductive metal layer is within the above range, the convex part is formed on the conductive microparticle surface corresponding to the convex part of the resin particle after the conductive microparticle preparation because the resin particle as the substrate has the convex part in the present invention, and it results in the good connection stability. The conductive metal layer thickness can be measured by a method described in Examples to be described later, for example.

The conductive metal layer may cover at least a part of the surface of the resin particle. It is preferable that there do not exist substantial cracks and a part where the conductive metal layer is not formed on the surface of the conductive metal layer. Herein, the term "substantial cracks and a part where the conductive metal layer is not formed" means that the cracks of the conductive metal layer and the exposure of the resin particle surface are not substantially visually observed when the surfaces of optional 10000 conductive microparticles are observed using a scanning electron microscope (magnification ratio: 1000).

The volume average particle diameter of the conductive microparticle is preferably not less than 1 μm, more preferably not less than 1.1 μm, still more preferably not less than 1.6 μm, and yet still more preferably not less than 2.1 μm. The volume average particle diameter is preferably not more than 51 μm, more preferably not more than 50 μm, still more preferably not more than 41 μm, yet still more preferably not more than 36 μm, and even more preferably not more than 31 μm. When the volume average particle diameter is within this range, the conductive microparticle can be suitably used for the electric connection of a fine and narrow electrode or wiring. The variation coefficient (CV value) of the particle diameter of the conductive microparticle is preferably not more than 10.0%, more preferably not more than 8.0%, still more preferably not more than 5.0%, yet still more preferably not more than 4.5%, and particularly preferably not more than 4.0%. The variation coefficient of the particle diameter is defined as a value calculated according to the following formula.

Variation coefficient of particle diameter (%)=100×
(standard deviation of particle diameter/volume
average particle diameter)

The average particle diameter of the number standard of 3000 particles obtained using a flow type particle image analyzer ("FPIA (registered trademark)-3000" manufactured by Sysmex Corporation) is preferably adopted as the volume average particle diameter of the conductive microparticle.

The conductive microparticle may also have an insulating resin layer formed on at least a part of the conductive microparticle surface. That is, the insulating resin layer may be further provided on the conductive metal layer surface. Thus, when the insulating resin layer is further laminated on the conductive metal layer of the surface, transverse conduction can be prevented that tend to be caused when a high-density circuit is formed and a terminal is connected.

The insulating resin layer is not particularly limited as long as the insulating resin layer can secure insulation properties between the conductive microparticles, and easily collapses or exfoliates by fixed pressure and/or heating. Examples thereof include polyolefins such as polyethylene; (meth)acrylate polymers and copolymers such as polymethyl(meth)acrylate; a thermoplastic resin and its crosslinked product such as polystyrene; thermosetting resins such as an epoxy resin, a phenol resin, and an amino resin (melamine resin); and water-soluble resins such as polyvinyl alcohol and mixtures thereof. The substrate particle (resin particle) itself may break before the insulating resin layer is broken when the insulating resin layer is much harder than the substrate particle (resin particle), and therefore, a resin being non-crosslinked or comparatively low-crosslinked is preferably used for the insulating resin layer.

The insulating resin layer may be a single layer or may comprise a plurality of layer. For example, the insulating resin layer may be a single layer or a plurality of coating layer. The insulating resin layer may be a layer in which a particle having insulation properties and having a granular, spherical, massive, scale, and other shapes is made to adhere to the surface of a conductive metal layer. Furthermore, the insulating resin layer may be a layer formed by subjecting the conductive metal layer surface to a chemical modification. The insulating resin layer may be a layer formed by the combination thereof. The thickness of the insulating resin layer is preferably not less than 0.01 μm and not more than 1 more preferably not less than 0.02 μm and not more than 0.5 μm, and still more preferably not less than 0.03 μm and not more than 0.4 μm. When the thickness of the insulating resin layer is within the above range, good electrical insulation properties between the particles is provided while conduction characteristics provided by the conductive microparticle are satisfactorily maintained.

A method for forming the conductive metal layer and a method for forming the insulating resin layer are not particularly limited, and the conductive metal layer can be formed for example by: a method including applying a plating by an electroless plating method and an electrolytic plating method on a substrate surface; and a method including forming a conductive metal layer on a substrate surface by physical deposition methods such as vacuum deposition, ion plating, and ion sputtering. Among these, the electroless plating method is particularly preferable since the conductive metal layer can be easily formed without requiring a large-scale device.

5. Anisotropic Conductive Material

The anisotropic conductive material contains the conductive microparticles and a binder resin, and the conductive microparticles are dispersed in the binder resin. The form of the anisotropic conductive material is not particularly limited, and examples thereof include various forms such as an anisotropic conductive film, an anisotropic conductive paste, an anisotropic conductive adhesive, and an anisotropic conductive ink. The provision of these anisotropic conductive materials between substrates or electrode terminals that face each other allows good electric connection. A liquid crystal display element conduction material (a conduction spacer and its composition) is also included in the anisotropic conductive material using the conductive microparticle. Suitable examples of the use of the anisotropic conductive material include input of a touch panel, and an LED. The anisotropic conductive material is particularly suitably used for mounting the touch panel.

The binder resin is an insulating resin, and examples thereof include: thermoplastic resins such as an acrylic resin, an ethylene-vinyl acetate resin, and a styrene-butadiene block copolymer; a curing resin composition curable by the reaction with curing agents such as a monomer having a glycidyl group, an oligomer, and isocyanate; and a curing resin composition curable by light or heat.

The anisotropic conductive material is obtained by dispersing the conductive microparticles in the binder resin in a desired form. For instance, substrates or electrode terminals may be connected by separately using the binder resin and a conductive microparticle and further allowing the conductive microparticle to exist together with the binder resin between the substrates or the electrode terminals to be connected.

In the anisotropic conductive material, the content of the conductive microparticle may be appropriately designed according to its use. For example, the content is preferably not less than 1% by volume, more preferably not less than 2% by volume, and still more preferably not less than 5% by volume in the whole amount of the anisotropic conductive material. The content is preferably not more than 50% by volume, more preferably not more than 30% by volume, and still more preferably not more than 20% by volume. Sufficient conduction may be hardly obtained when the content of the conductive microparticle is excessively decreased, and on the other hand, the conductive microparticles are brought into contact with each other, and a function as the anisotropic conductive material may be hardly exhibited when the content of the conductive microparticle is excessive.

The film thickness, the coating thickness of the paste or adhesive and the printing thickness in the anisotropic conductive material are preferably appropriately designed in consideration of the particle diameter of the conductive microparticle to be used and the specification of the electrode to be connected, so that the conductive microparticle is sandwiched between the electrodes to be connected and gaps of joining substrates are sufficiently filled with the binder resin layer on which substrates the electrode to be connected is formed.

This application claims the benefit of priority to Japanese Patent Application No. 2014-055361 filed on Mar. 18, 2014 and Japanese Patent Application No. 2014-216368 filed on Oct. 23, 2014. The entire contents of the specifications of Japanese Patent Application No. 2014-055361 filed on Mar. 18, 2014 and Japanese Patent Application No. 2014-216368 filed on Oct. 23, 2014 are incorporated herein by reference.

EXAMPLES

The present invention is hereinafter described in more detail in the following by way of Examples, however, the present invention is not limited to the following Examples, and modifications which do not depart from the spirit and scope of the present invention are allowed and embraced within the technical scope of the present invention. Hereinafter, "part" and "%" mean "part by mass" and "% by mass", respectively, unless otherwise noted.

1. Method for Measuring Physical Properties

Variety of physical properties were measured by the following methods.

<Volume Average Particle Diameter and Variation Coefficient (CV Value) of Resin Particle>

In the case of a resin particle and core, 20 parts of a 1% aqueous solution of a polyoxyethylene alkylether sulfate ester ammonium salt ("Hitenol (registered trademark) N-08" manufactured by Dai-Ichi Kogyo Seiyaku Co., Ltd.) as an emulsifier was added to 0.1 parts of the resin particle or core, and a dispersion liquid prepared by ultrasonic dispersion for 10 minutes was used as a measurement sample. In the case of a seed particle, a dispersion liquid obtained by a hydrolysis and condensation reactions was diluted by a 1% aqueous solution of a polyoxyethylene alkylether sulfate ester ammonium salt ("Hitenol (registered trademark) N-08" manufactured by Dai-Ichi Kogyo Seiyaku Co., Ltd.) to prepare a measurement sample. The particle diameters (μm) of 30000 particles were measured by a particle diameter distribution measuring device ("COULTER MULTISIZER III type" manufactured by Beckman Coulter, Inc.) to obtain a volume average particle diameter. Regarding the resin particle and the core, the standard deviation of the particle diameter in volumetric basis was also obtained together with the volume average particle diameter. The variation coefficient of the particle diameter (CV value) was calculated according to the following formula.

Variation coefficient of particle diameter (%)=100× (standard deviation of particle diameter/volume average particle diameter)

<Structure of Convex Part>

The cross-sectional surface of the resin particle was photographed by a scanning transmission electron microscope at a magnification ratio of 10,000 to 30,000 and an accelerating voltage of 20 kV.

<Average Height and Average Base Diameter of Convex Part>

In a SEM image obtained by photographing the resin particle at a magnification ratio of not less than 10,000 using a scanning electron microscope (SEM), and connected with a line segment were two points at which the convex part boundary in the peripheral part and the spherical part boundary intersected with each other in the resin particle. The distance between the line segment and a top convex part of the convex part was defined as a height, and the length of the line segment (the distance between the two points at which the convex part boundary and the spherical part boundary intersected with each other) was measured as a base diameter. The heights and base diameters of 50 convex parts were measured per one kind of resin particle, and averaged to obtain the average height and average base diameter of the convex part of the resin particle.

<Number of Convex Part>

The number of the convex part on the resin particle was measured by photographing the resin particle at a magnification ratio of not less than 3,000 using a scanning electron microscope (SEM). The number of the convex part of five resin particles per one kind of resin particle was measured, averaged, and doubled to obtain the number of the convex part per one resin particle.

<Number Density of Convex Part>

A scanning electron microscope photograph obtained at a magnification ratio of not less than 10,000 was used, and a caliper diameter calculation tool provided with the device was used. The diameter of the spherical part or the diameter including the spherical part and a peripheral layer was calculated. The number density of the convex part was calculated by dividing the number of the convex part per one resin particle by the surface area of the spherical part (the square of 4×π×the radius of the spherical part) or the surface area of the peripheral layer (the square of 4×π×(the total of the radius of the spherical part and thickness of the peripheral layer)).

<Variation Index of Convex Part Between Particles>

Regarding five resin particles, the number of the convex part per one particle was calculated to derive the standard deviation between them, thereby obtaining the variation index of the convex part between particles according to the following formula.

Variation index of protrusion between particles= (standard deviation of number of convex part for five particles)/(average number of convex part per one resin particle)

<Variation Index of Convex Part on Single Particle>

When a particle was viewed on an orthographic protrusion plane, two lines normal to each other at the center of the particle were drawn, to divide the particle into four divisions. The number of the convex part was measured for each division, and the standard deviation of the number of the protrusion in one particle was calculated. For one kind of resin particle, the number of the convex part of five resin particles was measured, and the average value of the standard deviations was calculated. The variation index of protrusion on the single particle was calculated according to the following formula.

Variation index of protrusion on single particle= (standard deviation of convex part per one resin particle)/(average number of convex part per one resin particle)

<Contact Angle when Convex Part is Assumed to be Droplet with Respect to Spherical Part>

The cross-section of the resin particle was photographed at a magnification ratio of not less than 10,000 using a scanning transmission electron microscope, and the angle between the convex part boundary and the spherical part boundary was defined as a contact angle. Furthermore, the contact angles of 10 or more convex parts for one kind of resin particle were measured and averaged, and the averaged value was defined as a contact angle when the convex part of the resin particle was assumed to be a droplet with respect to the spherical part.

<Protrusion Falling Test>

Toluene (25 parts) was added to 1 part of resin particles, and 250 parts of zirconia beads having a diameter of 1 mm were further added. Dispersion was performed for 10 minutes at 200 rpm using two stainless steel stirring blades. After the dispersion treatment, the dispersion liquid was made to pass through a metal sieve having a mesh size of 500 μm to remove the zirconia beads. The resin particle was taken out by filtering using a membrane filter (3.0 μm; manufactured by ADVANTEC Co., Ltd.), and dried.

The obtained particles were observed using a scanning electron microscope (SEM), and the number of protrusion was calculated for the five particles. The falling property of the protrusion was determined according to the following criteria from the average number of protrusion per particle after and before the treatment.

The case where the value of (average number of protrusion per particle after treatment)/(average number of protrusion per particle before treatment) exceeded 0.9 was evaluated as "○", and the case where the value was not more than 0.9 was evaluated as "x".

<Melting Point Measuring Method>

A glass plate on which particles were sprayed was placed in a heating furnace that is heated to a predetermined temperature, and heat-treated for 60 minutes. The particle after and before the heat treatment was observed by SEM, and a temperature was defined as the melting point of the peripheral part at which the shape of the contact point of the particle and glass plate was changed.

<Number Average Particle Diameter of Conductive Microparticle and Film Thickness of Conductive Metal Layer>

The number average particle diameter X (μm) of 3000 substrate particles (resin particles) and the number average particle diameter Y (μm) of 3000 conductive microparticles were measured using a flow type particle image analyzer ("FPIA (registered trademark)-3000" manufactured by Sysmex Corporation). The measurement was performed after 17.5 parts of a 1.4% aqueous solution of polyoxy ethylene oleyl ether ("Emulgen (registered trademark) 430" manufactured by Kao Corporation) as an emulsifier was added to 0.25 parts of the particles, and the particles were ultrasonically dispersed for 10 minutes. The film thickness of the conductive metal layer was calculated according to the following formula.

Film thickness of conductive metal layer (μm)=(Y−X)/2

<Conductivity Evaluation>

Using the conductive microparticles obtained in Examples and Comparative Examples, anisotropic conductive materials (anisotropic conductive pastes) were produced by the following method. The presence or absence of indentation formation and an initial resistance value were evaluated by the following method. The evaluation results of the initial resistance value and indentation are shown in Table 5.

That is, using a rotation revolution type stirrer, 100 parts of an epoxy resin ("STRUCT BOND (registered trademark) XN-5A" manufactured by Mitsui Chemicals, Inc.) as a binder resin were added to 2.0 parts of conductive microparticles, and the conductive microparticles were stirred and dispersed for 10 minutes, to obtain a conductive paste.

The obtained anisotropic conductive paste was sandwiched between a glass substrate on which ITO electrodes were formed at pitches of 100 μm and a glass substrate on which aluminum patterns were formed at pitches of 100 μm. The glass substrates were thermocompression-bonded under pressure bonding conditions of 2 MPa and 150° C., and the binder resin was allowed to cure to obtain a connection structure.

The initial resistance value between the electrodes of the obtained connection structure was measured. The case where the initial resistance value was less than 5Ω was evaluated as "very good"; the case where the initial resistance value was not less than 5Ω and less than 10Ω was evaluated as "good"; the case where the initial resistance value was not less than 10Ω and less than 15Ω was evaluated as "average"; and the case where the initial resistance value was not less than 15Ω was evaluated as "poor".

2. Production of Resin Particle

The abbreviations and solubility parameters of monomers used to produce the resin particle are shown in Table 1.

TABLE 1

| compound name | abbreviations | Solubility Parameter ((cal/cm$^3$)$^{1/2}$) |
|---|---|---|
| 3-methacryloxypropyltrimethoxysilane | MPTMS | 8.89 |
| 3-acryloxypropyltrimethoxysilane | APTMS | 8.89 |
| vinyltrimethoxysilane | VTMS | 7.50 |
| n-butyl methacrylate | nBMA | 9.15 |
| methyl methacrylate | MMA | 9.41 |
| 2-hydroxyethyl methacrylate | HEMA | 12.47 |
| 1,6-hexanediol diacrylate | 16HXA | 10.03 |
| 1,6-hexanediol dimethacrylate | 16HX | 9.89 |
| cyclohexyl methacrylate | CHMA | 9.93 |
| stylene | St | 9.24 |
| divinylbenzene | DVB | 9.28 |
| neopentylglycol dimethacrylate | NPGDMA | 9.78 |
| methacrylic acid | MAA | 10.73 |

2-1. Production of Core Particle

Synthetic Example 1

In a 4-necked flask equipped with a cooling pipe, a thermometer, and a dripping port placed were 1000 parts of ion exchange water, 3 parts of 25% ammonia water, and 600 parts of methanol. MPTMS ("KBM503" manufactured by Shin-Etsu Chemical Co., Ltd.) (100 parts) was added as a core monomer component (core silane monomer) from the dripping port under stirring to subject MPTMS to a hydrolysis and condensation reactions, thereby preparing an emulsion containing a polysiloxane particle (polymerizable polysiloxane particle) as a seed particle having a methacryloyl group. The obtained emulsion containing the polysiloxane particle was sampled after 2 hours had elapsed since the initiation of the reaction, and the particle diameter was measured. The volume average particle diameter was 6.06 µm.

Then, to a solution obtained by dissolving 50 parts of a 20% aqueous solution of a polyoxy ethylene styrenated phenyl ether sulfate ester ammonium salt ("Hitenol (registered trademark) NF-08" manufactured by Dai-Ichi Kogyo Seiyaku Co., Ltd.) as an emulsifier in 2000 parts of ion exchange water, a solution obtained by dissolving 850 parts of nBMA, 850 parts of MMA, 150 parts of HEMA, and 150 parts of 16HXA as a core monomer component (core vinyl monomer), and 42 parts of 2,2'-azobis(2,4-dimethylvaleronitrile) ("V-65" manufactured by Wako Pure Chemical Industries, Ltd.) were added for emulsification and dispersion, to prepare an emulsified liquid containing the core monomer component (core vinyl monomer).

The obtained emulsified liquid was added to the emulsion containing the polysiloxane particle, and these were stirred for 1 hour. Then 840 parts of 10% aqueous solution of polyvinyl alcohol and 2000 parts of ion exchange water were further added to prepare a reaction liquid. The temperature of the reaction liquid was increased to 65° C. under a nitrogen atmosphere and held for 2 hours, to subject the monomer component to radical polymerization. The emulsion after the radical polymerization was subjected to solid-liquid separation to obtain a cake. The obtained cake was washed with ion exchange water and methanol, and then vacuum-dried at 40° C. for 12 hours to obtain a core particle 1. The particle diameter, variation coefficient (CV value), and degree of crosslinking of the core particle 1 were shown in Table 2.

Synthetic Examples 2 to 9

Core particles 2 to 9 were obtained in the same manner as in Synthetic Example 1 except that the amounts of a core silane monomer, ion exchange water, methanol, and ammonia water were appropriately changed to produce polysiloxane particles (seed particles) having an average particle diameter according to volumetric basis as shown in Table 2, and the kind and use amount of the core vinyl monomer were changed as shown in Table 2. The particle diameters, variation coefficients (CV values), and degrees of crosslinking of the core particles 2 to 9 were shown in Table 2.

Synthetic Example 10

To a solution obtained by dissolving 50 parts of a 20% aqueous solution of a polyoxy ethylene styrenated phenyl ether sulfate ester ammonium salt ("Hitenol (registered trademark) NF-08" manufactured by Dai-Ichi Kogyo Seiyaku Co., Ltd.) as an emulsifier in 2000 parts of ion exchange water in a 4-necked flask equipped with a cooling pipe, a thermometer, and a dripping port, a solution obtained by dissolving 100 parts of MPTMS, 850 parts of nBMA, and 850 parts of MMA, 150 parts of HEMA, 150 parts of 16HXA as a core monomer composition (a core vinyl monomer and a core silane monomer), and 42 parts of 2,2'-azobis(2,4-dimethylvaleronitrile) ("V-65" manufactured by Wako Pure Chemical Industries, Ltd.) was added for suspension, to prepare an suspension liquid containing a monomer component.

Further, 840 parts of a 10% aqueous solution of polyvinyl alcohol and 6000 parts of ion exchange water were added to produce a reaction liquid. The temperature of the reaction liquid was increased to 65° C. under a nitrogen atmosphere, and held for 2 hours, to subject the monomer component to radical polymerization. The suspension after the radical polymerization was subjected to solid-liquid separation to obtain a cake. The obtained cake was washed with ion exchange water and methanol, and then vacuum-dried at 40° C. for 12 hours to obtain a core particle 10. Furthermore, classification was performed using meshes having mesh sizes of 17 µm and 24 µm to obtain a core particle 11. The particle diameters, variation coefficients (CV value), and degrees of crosslinking of the core particles 10 and 11 were shown in Table 2.

Synthetic Example 11

A core particle 12 was obtained in the same manner as in Synthetic Example 10 (core particle 10) except that the kind and use amount of a core monomer composition were changed as shown in Table 2. Furthermore, classification was performed using meshes having mesh sizes of 8 µm and 15 µm to obtain a core particle 13. The particle diameters, variation coefficients (CV value), and degrees of crosslinking of the core particles 12 and 13 were shown in Table 2. The particle diameter before the classification was 12.84 µm, and the variation coefficient (CV value) was 30.7%.

Synthetic Example 12

A core particle 14 was obtained in the same manner as in Synthetic Example 1 except that the amounts of a core silane monomer, ion exchange water, methanol, and ammonia water were appropriately changed to produce a polysiloxane particle (seed particle), and the kind and use amount of the core vinyl monomer were changed as shown in Table 2. The core particle 14 was as shown in Table 2.

Synthetic Example 13

In a 4-necked flask equipped with a cooling pipe, a thermometer, and a dripping port placed were 1000 parts of ion exchange water, 3 parts of 25% ammonia water, and 600 parts of methanol. MPTMS ("KBM503" manufactured by Shin-Etsu Chemical Co., Ltd.)(40.7 parts) and 59.3 parts of VTMS ("KBM1003" manufactured by Shin-Etsu Chemical Co., Ltd.) as a core monomer component (core silane monomer) were added from the dripping port under stirring, and MPTMS and VTMS were subjected to a hydrolysis and condensation reactions, thereby preparing an emulsion containing a polysiloxane particle (polymerizable polysiloxane particle) as a seed particle having a methacryloyl group and a vinyl group. The obtained emulsion containing the polysiloxane particle was sampled after 2 hours had elapsed since the initiation of the reaction, and the particle diameter was measured. The volume average particle diameter was 2.36 µm.

Then, to a solution obtained by dissolving 2.5 parts of a 20% aqueous solution of a polyoxy ethylene styrenated phenyl ether sulfate ester ammonium salt ("Hitenol (registered trademark) NF-08" manufactured by Dai-Ichi Kogyo Seiyaku Co., Ltd.) as an emulsifier in 50 parts of ion exchange water, a solution obtained by dissolving 50 parts of DVB ("DVB960" manufactured by NIPPON STEEL & SUMIKIN CHEMICAL CO., LTD.) as a core monomer component (core vinyl monomer) and 1.6 parts of 2,2'-azobis(2,4-dimethylvaleronitrile) ("V-65" manufactured by Wako Pure Chemical Industries, Ltd.) was added for emulsification and dispersion, to prepare an emulsified liquid A containing the core monomer component (core vinyl monomer).

Then, to a solution obtained by dissolving 0.4 parts of a 20% aqueous solution of a polyoxy ethylene styrenated phenyl ether sulfate ester ammonium salt ("Hitenol (registered trademark) NF-08" manufactured by Dai-Ichi Kogyo Seiyaku Co., Ltd.) as an emulsifier in 15 parts of ion exchange water, 15 parts of CHMA as a core monomer component (core vinyl monomer) was added for emulsification and dispersion, to prepare an emulsified liquid B containing the core monomer component (core vinyl monomer).

The obtained emulsified liquid A was added to the emulsion containing the polysiloxane particle, and these were stirred for 1 hour. Then 8.3 parts of a 20% aqueous solution of a polyoxy ethylene styrenated phenyl ether sulfate ester ammonium salt ("Hitenol (registered trademark) NF-08" manufactured by Dai-Ichi Kogyo Seiyaku Co., Ltd.) was further added to produce a reaction liquid. The temperature of the reaction liquid was increased to 65° C. under a nitrogen atmosphere, and held for 1 hour, and an emulsified liquid B was then added to prepare a reaction liquid. The temperature of the reaction liquid was increased to 65° C. under a nitrogen atmosphere, and held for 2 hours to subject the monomer component to radical polymerization.

The emulsion after the radical polymerization was subjected to solid-liquid separation to obtain a cake. The obtained cake was washed with ion exchange water and methanol, and then vacuum-dried at 120° C. for 2 hours to obtain a core particle 15. The volume average particle diameter, variation coefficient (CV value), and degree of crosslinking of the core particle 15 were shown in Table 2.

TABLE 2

| | | core monomer composition | | core particle | core | core degree of |
|---|---|---|---|---|---|---|
| | No. | core silane monomer (parts by mass) | core vinyl monomer (parts by mass) | diameter (μm) | CV value (%) | crosslinking (%) |
| Synthetic Example 1 | core particle 1 | MPTMS = 100 | nBMA/MMA/1.6HXA/HEMA = 850/850/150/150 | 18.34 | 2.8 | 11.9 |
| Synthetic Example 2 | core particle 2 | MPTMS = 100 | nBMA/MMA/1.6HXA/HEMA = 850/850/150/150 | 9.30 | 3.3 | 11.9 |
| Synthetic Example 3 | core particle 3 | MPTMS = 100 | St/DVB = 440/60 | 20.41 | 2.4 | 26.7 |
| Synthetic Example 4 | core particle 4 | MPTMS = 100 | nBMA/1.6HXA/HEMA = 1100/750/150 | 19.33 | 3.4 | 40.5 |
| Synthetic Example 5 | core particle 5 | MPTMS = 100 | nBMA/MMA/1.6HXA/HEMA = 850/850/150/150 | 19.24 | 6.2 | 11.9 |
| Synthetic Example 6 | core particle 6 | MPTMS = 100 | nBMA/1.6HXA/HEMA = 1665/185/150 | 20.01 | 4.1 | 13.6 |
| Synthetic Example 7 | core particle 7 | MPTMS = 100 | nBMA/1.6HXA/HEMA = 700/1150/150 | 18.50 | 3.4 | 59.5 |
| Synthetic Example 8 | core particle 8 | MPTMS = 100 | nBMA/MMA/1.6HXA/HEMA = 850/850/150/150 | 4.37 | 5.2 | 11.9 |
| Synthetic Example 9 | core particle 9 | MPTMS = 100 | CHMA/1.6HX/HEMA = 1665/185/150 | 19.75 | 8.1 | 13.6 |
| Synthetic Example 10 | core particle 10 | MPTMS = 100 | nBMA/MMA/1.6HXA/HEMA = 850/850/150/150 | 21.81 | 47.7 | 11.9 |
| | core particle 11 | | | 20.52 | 7.5 | 11.9 |
| Synthetic Example 11 | core particle 12 | 0 | nBMA/MMA/1.6HXA/HEMA = 850/850/150/150 | 12.84 | 30.7 | 7.5 |
| | core particle 13 | | | 11.82 | 6.2 | 7.5 |
| Synthetic Example 12 | core particle 14 | MPTMS = 100 | CHMA/1.6HX/HEMA = 59.2/33.3/7.5 | 2.97 | 3.9 | 66.7 |
| Synthetic Example 13 | core particle 15 | MPTMS/ VTMS = 40.7/59.3 | DVB/CHMA = 50/15 | 3.01 | 2.6 | 90.9 |

2-2. Production of Resin Particle

Production Example 1

In a 4-necked flask equipped with a cooling pipe, a thermometer, and a dripping port mixed were 525 parts of methanol, 1050 parts of ion exchange water, 1.4 parts of a 25% ammonia water, 17.5 parts of a 20% aqueous solution of a polyoxy ethylene styrenated phenyl ether sulfate ester ammonium salt, and core particles 1 (70 parts) were dispersed. MPTMS (7.0 parts) was then added as a shell monomer component (shell silane monomer), and these were stirred for 2 hours, to prepare a core particle dispersion liquid. To a solution obtained by dissolving 0.9 parts of a 20% aqueous solution of a polyoxy ethylene styrenated phenyl ether sulfate ester ammonium salt in 100 parts of ion exchange water, a solution obtained by dissolving 30.8 parts of St and 4.2 parts of DVB ("DVB960" manufactured by NIPPON STEEL & SUMIKIN CHEMICAL CO., LTD.) as a shell monomer component (shell vinyl monomer), and 0.4 parts of 2,2'-azobis(2,4-dimethylvaleronitrile) ("V-65" manufactured by Wako Pure Chemical Industries, Ltd.) was added. An emulsified liquid containing the emulsified and dispersed shell monomer component (shell vinyl monomer) was added to the core particle dispersion liquid, and these were stirred for 1 hour. Then, a solution obtained by dissolving 0.04 parts of Kayanol Milling 4GW (manufactured by Nippon Kayaku Co., Ltd.) as a dispersing auxiliary agent in 20 parts of ion exchange water was added to produce a reaction liquid. The temperature of the reaction liquid was increased to 65° C. under a nitrogen atmosphere, and held for 2 hours, to subject the monomer component to radical polymerization. The emulsion after the radical polymerization was subjected to solid-liquid separation to obtain a cake. The obtained cake was washed with ion exchange water and methanol, and then vacuum-dried at 40° C. for 12 hours to obtain a resin particle (1).

Production Examples 2 to 8, 10 to 13, 16, 17, 19 to 25

As shown in Table 3 or 4, resin particles (2) to (8), (10) to (13), (16), (17), and (19) to (25) were obtained in the same manner as in Production Example 1 except that a core particle, a shell silane monomer, a shell vinyl monomer, a 20% aqueous solution of a polyoxy ethylene styrenated phenyl ether sulfate ester ammonium salt used for an emulsified liquid containing a shell monomer component (shell vinyl monomer) (described as a "surfactant aqueous solution" in Table), and Kayanol Milling 4GW were used.

Production Example 9

In a 4-necked flask equipped with a cooling pipe, a thermometer, and a dripping port, mixed were 525 parts of methanol, 1050 parts of ion exchange water, 1.4 parts of 25% ammonia water, and 17.5 parts of a 20% aqueous solution of a polyoxy ethylene styrenated phenyl ether sulfate ester ammonium salt. After core particles 3 (70 parts) were dispersed, VTMS (14.0 parts) was then added as a shell monomer component (shell silane monomer), and these were stirred for 2 hours, to prepare a core particle dispersion liquid. A solution obtained by dissolving 0.4 parts of 2,2'-azobis(2,4-dimethylvaleronitrile) ("V-65" manufactured by Wako Pure Chemical Industries, Ltd.) in 4 parts of methanol was added to produce a reaction liquid. The temperature of the reaction liquid was increased to 65° C. under a nitrogen atmosphere, and held for 2 hours, to subject the monomer component to radical polymerization. The emulsion after the radical polymerization was subjected to solid-liquid separation to obtain a cake. The obtained cake was washed with ion exchange water and methanol, and then vacuum-dried at 40° C. for 12 hours to obtain a resin particle (9).

Production Examples 14, 15, and 18

Resin particles (14), (15), and (18) were obtained in the same manner as in Production Example 9 except that a core particle as shown in Table 3 was used, and a monomer kind as shown in Table 3 was used as a shell silane monomer with the use amount as shown in Table 3.

Production Example 26

In a 4-necked flask equipped with a cooling pipe, a thermometer, and a dripping port, mixed were 80 parts of ethanol, 30 parts of ion exchange water, and 3.6 parts of polyvinyl pyrrolidone ("PVP K-30" manufactured by Wako Pure Chemical Industries, Ltd.), and core particles 2 (30 parts) were dispersed. A solution obtained by mixing 0.03 parts of 2,2'-azobis(2-methylbutyronitrile) ("V-59" manufactured by Wako Pure Chemical Industries, Ltd.), 0.6 parts of NPGDMA, and 2.4 parts of St was then added to produce a reaction liquid. The temperature of the reaction liquid was increased to 70° C. under a nitrogen atmosphere, and held for 5 hours, to subject the monomer component to radical polymerization. The emulsion after the radical polymerization was subjected to solid-liquid separation to obtain a cake. The obtained cake was washed with ion exchange water and methanol, and then vacuum-dried at 40° C. for 12 hours to obtain a resin particle (26).

Production Example 27

A resin particle (27) was obtained in the same manner as in Production Example 26 except that a core particle as shown in Table 4 was used.

Production Example 28

The temperature of a solution obtained by adding 1000 parts of ion exchange water, 95 parts of St, and 5 parts of MAA in a 4-necked flask equipped with a cooling pipe, a thermometer, and a dripping port, and mixing these was increased to 70° C. under a nitrogen atmosphere. A solution obtained by mixing 0.8 parts of ammonium persulfate and 100 parts of ion exchange water was then introduced, to subject the monomer component to radical polymerization for 8 hours. The emulsion after the radical polymerization was powderized by spray dry, to obtain a 300-nm small particle. The obtained small particle (10 parts) and 9100 parts of a core particle were composited by hybridization, to obtain a resin particle (28).

Production Example 29

In a 4-necked flask equipped with a cooling pipe, a thermometer, and a dripping port mixed were 364 parts of methanol, 1456 parts of ion exchange water, 4.4 parts of 25% ammonia water, and 17.5 parts of a 20% aqueous solution of a polyoxy ethylene styrenated phenyl ether sulfate ester ammonium salt. After core particles 14 (70 parts) were dispersed, 14.0 parts of MPTMS was added as a shell monomer component (shell silane monomer), and these were stirred for 2 hours, to prepare a core particle dispersion liquid. To a solution obtained by dissolving 0.2 parts of the 20% aqueous solution of a polyoxy ethylene styrenated phenyl ether sulfate ester ammonium salt in 100 parts of ion exchange water, a solution obtained by dissolving 7.0 parts of DVB ("DVB960" manufactured by NIPPON STEEL & SUMIKIN CHEMICAL CO., LTD.) as a shell monomer component (shell vinyl monomer) and 2.1 parts of 2,2'-azobis(2,4-dimethylvaleronitrile) ("V-65" manufactured by Wako Pure Chemical Industries, Ltd.) was added. An emulsified liquid containing the emulsified and dispersed shell monomer component (shell vinyl monomer) was added to the core particle dispersion liquid, and these were stirred for 1 hour. Then, 21.0 parts of a 10% aqueous solution of polyvinyl alcohol was added to produce a reaction liquid. The temperature of the reaction liquid was increased to 65° C. under a nitrogen atmosphere, and held for 2 hours, to subject the monomer component to radical polymerization. The emulsion after the radical polymerization was subjected to solid-liquid separation to obtain a cake. The obtained cake was washed with ion exchange water and methanol, and then vacuum-dried at 80° C. for 4 hours to obtain a resin particle (29).

Production Example 30

A resin particle (30) was obtained in the same manner as in Production Example 29 except that a core particle as shown in Table 4 was used; the use amount of a monomer kind as shown in Table 4 was used as a shell silane monomer; the use amount of a monomer kind as shown in Table 4 was used as a shell vinyl monomer; and drying treatment was changed to a firing treatment for 1 hour at 280° C. under a nitrogen atmosphere.

A mass ratio between the core monomer composition and the shell silane monomer (shell silane monomer/core monomer composition), a mass ratio between the shell vinyl monomer and the shell silane monomer (shell vinyl monomer/shell silane monomer), the solubility parameter $SP_{core}$ of the core monomer composition, the difference $\Delta SP$ between the solubility parameter of the shell silane monomer and the solubility parameter of the core monomer composition (shell silane monomer–core monomer composition) in Production Examples 1 to 30 are shown in Tables 3 and 4.

Regarding each of the obtained resin particles (1) to (30), the results of the volume average particle diameter, variation coefficient (CV value), number density of the convex part, average height of the convex part, average base diameter of the convex part, ratio between the height of the convex part and the base (height/base), ratio between the height of the convex part and the volume average particle diameter of the resin particle (height/resin particle diameter), product of the height of the convex part and base of the convex part (height×base), number of the convex part per one resin particle, number (convex part density) of the convex part per surface area of 1 µm² of the spherical part, surface area of the spherical part (spherical part surface area), contact angle (contact angle) when the convex part is assumed to be a droplet with respect to the spherical part, protrusion falling test, and melting point measurement of the peripheral part are shown in Tables 3 and 4.

TABLE 3

| | | | | | | production example | | | | |
|---|---|---|---|---|---|---|---|---|---|---|
| | | | | | | 1 | 2 | 3 | 4 | 5 |
| | | | resin particle No. | | | (1) | (2) | (3) | (4) | (5) |
| core | | | core particle No. | | | 1 | 1 | 1 | 2 | 2 |
| | | | $SP_{CORE}$ | | $(cal/cm^3)^{1/2}$ | | 9.54 | | | 9.54 |
| shell | composition | silane monomer | MPTMS | | parts | 7 | 14 | 35 | 5.4 | 5.4 |
| | | | APTMS | | parts | | | | | |
| | | | VTMS | | parts | | | | | |
| | | vinyl monomer | MAA | | parts | | | | | |
| | | | CHMA | | parts | | | | | |
| | | | NPGDMA | | parts | | | | | |
| | | | 16HXA | | parts | | | | | |
| | | | St | | parts | 30.8 | 61.6 | 154.0 | 23.7 | 47.4 |
| | | | DVB | | parts | 4.2 | 8.4 | 21.0 | 3.2 | 6.5 |
| | additives | | aqueous solution of surfactant | | parts | 0.9 | 1.8 | 4.4 | 0.7 | 1.3 |
| | | | dispersing auxiliary agent | | parts | 0.04 | 0.08 | 0.21 | 0.03 | 0.06 |
| | ratio | | shell silane monomer/core monomer composition | | | 0.10 | 0.20 | 0.50 | 0.08 | 0.08 |
| | | | shell vinyl monomer/shell silane monomer | | | 5.0 | 5.0 | 5.0 | 5.0 | 10.0 |
| | | | $\Delta SP$ | | $(cal/cm^3)^{1/2}$ | −0.65 | −0.65 | −0.65 | −0.65 | −0.65 |
| resin particle | | | average diameter | | µm | 20.90 | 23.06 | 26.40 | 10.57 | 11.45 |
| | | | CV value | | % | 6.6 | 2.5 | 3.8 | 3.7 | 3.1 |
| | spherical part | | surface area | | µm² | 1056 | 1056 | 1056 | 272 | 272 |
| | peripheral part | convex part | average height | | µm | 0.14 | 0.69 | 2.07 | 0.06 | 0.14 |
| | | | average base diameter | | µm | 0.29 | 1.25 | 4.04 | 0.18 | 0.38 |
| | | | average height/average base diameter | | | 0.480 | 0.550 | 0.510 | 0.330 | 0.370 |
| | | | average height/resin particle diameter | | | 0.007 | 0.030 | 0.078 | 0.006 | 0.012 |
| | | | average height * average base diameter | | µm² | 0.04 | 0.87 | 8.35 | 0.01 | 0.05 |
| | | | contact angle | | ° | 68 | 79 | 57 | 63 | 60 |
| | | | number per one resin particle | | number/one particle | 2907 | 883 | 83 | 1552 | 1712 |
| | | | number density | | numer/µm² | 2.75 | 0.84 | 0.08 | 5.71 | 6.30 |
| | | | variation index (between particles) | | | 4.7 | 3.0 | 10.3 | 3.1 | 1.0 |
| | | | vatiation index (on single particle) | | | 0.3 | 0.8 | 2.0 | 0.8 | 0.6 |
| | | | melting point | | ° C. | 250≤ | 250≤ | 250≤ | 250≤ | 250≤ |
| | | | result of protrusion falling test | | | ○ | ○ | ○ | ○ | ○ |

| | | | | | | production example | | | | |
|---|---|---|---|---|---|---|---|---|---|---|
| | | | | | | 6 | 7 | 8 | 9 | 10 |
| | | | resin particle No. | | | (6) | (7) | (8) | (9) | (10) |
| core | | | core particle No. | | | 2 | 2 | 3 | 3 | 4 |
| | | | $SP_{CORE}$ | | $(cal/cm^3)^{1/2}$ | 9.54 | 9.54 | | 9.22 | 9.68 |
| shell | composition | silane monomer | MPTMS | | parts | 5.4 | 5.4 | 14 | | 14 |
| | | | APTMS | | parts | | | | | |
| | | | VTMS | | parts | | | | 14 | |
| | | vinyl monomer | MAA | | parts | | | | — | |
| | | | CHMA | | parts | | | | — | |
| | | | NPGDMA | | parts | | | | — | |
| | | | 16HXA | | parts | | | | — | |

TABLE 3-continued

|  |  |  |  |  |  |  |  |  |  |
|---|---|---|---|---|---|---|---|---|---|
|  |  |  | St | parts | 66.4 | 99.6 | 61.6 | — | 61.6 |
|  |  |  | DVB | parts | 9.1 | 13.6 | 8.4 | — | 8.4 |
|  | additives |  | aqueous solution of surfactant | parts | 1.9 | 2.8 | 1.8 | — | 1.8 |
|  |  |  | dispersing auxiliary agent | parts | 0.08 | 0.12 | 0.08 | — | 0.08 |
|  | ratio |  | shell silane monomer/core monomer composition |  | 0.08 | 0.08 | 0.20 | 0.20 | 0.20 |
|  |  |  | shell vinyl monomer/shell silane monomer |  | 14.0 | 21.0 | 5.0 | — | 5.0 |
|  |  |  | ΔSP | $(cal/cm^3)^{1/2}$ | −0.65 | −0.65 | −0.33 | −1.72 | −0.79 |
| resin |  |  | average diameter | μm | 12.06 | 12.92 | 23.13 | 20.63 | 22.78 |
| particle |  |  | CV value | % | 3.6 | 4.2 | 7.2 | 1.5 | 8.2 |
|  | spherical part |  | surface area | μm² | 272 | 272 | — | 1308 | 1173 |
|  | peripheral part | convex part | average height | μm | 0.40 | 1.18 | — | 0.55 | 2.93 |
|  |  |  | average base diameter | μm | 1.97 | 5.84 | — | 1.53 | 7.95 |
|  |  |  | average height/average base diameter |  | 0.200 | 0.200 | — | 0.360 | 0.370 |
|  |  |  | average height/resin particle diameter |  | 0.033 | 0.091 | — | 0.027 | 0.128 |
|  |  |  | average height * average base diameter | μm² | 0.79 | 6.89 | — | 0.84 | 23.25 |
|  |  |  | contact angle | ° | 29 | 17 | — | 54 | 41 |
|  |  |  | number per one resin particle | number/one particle | 51 | 10 | — | 444 | 29 |
|  |  |  | number density | numer/μm² | 0.19 | 0.04 | — | 0.34 | 0.02 |
|  |  |  | variation index (between particles) |  | 9.7 | 9.8 | — | 9.3 | 13.7 |
|  |  |  | vatiation index (on single particle) |  | 1.8 | 3.5 | — | 1.5 | 6.2 |
|  |  |  | melting point | ° C. | 250≤ | 250≤ | 250≤ | 250≤ | 250≤ |
|  |  |  | result of protrusion falling test |  | ○ | ○ | — | ○ | ○ |

|  |  |  |  |  | production example | | | | |
|---|---|---|---|---|---|---|---|---|---|
|  |  |  |  |  | 11 | 12 | 13 | 14 | 15 |
|  |  |  | resin particle No. |  | (11) | (12) | (13) | (14) | (15) |
| core |  |  | core particle No. |  |  | 4 |  |  | 5 |
|  |  |  | $SP_{CORE}$ | $(cal/cm^3)^{1/2}$ |  | 9.68 |  |  | 9.54 |
| shell | composition | silane monomer | MPTMS | parts | 7 | 14 | 14 | 14 | 14 |
|  |  |  | APTMS | parts |  |  |  |  |  |
|  |  |  | VTMS | parts |  |  |  |  |  |
|  |  | vinyl monomer | MAA | parts |  |  |  | — | — |
|  |  |  | CHMA | parts |  | 61.6 |  | — | — |
|  |  |  | NPGDMA | parts |  |  |  | — | — |
|  |  |  | 16HXA | parts |  | 8.4 |  | — | — |
|  |  |  | St | parts | 30.8 |  |  | — | — |
|  |  |  | DVB | parts | 4.2 |  | 70.0 | — | — |
|  | additives |  | aqueous solution of surfactant | parts | 0.9 | 1.8 | 1.8 | — | — |
|  |  |  | dispersing auxiliary agent | parts | 0.04 | 0 | 0 | — | — |
|  | ratio |  | shell silane monomer/core monomer composition |  | 0.10 | 0.20 | 0.20 | 0.20 | 0.20 |
|  |  |  | shell vinyl monomer/shell silane monomer |  | 5.0 | 5.0 | 5.0 | — | — |
|  |  |  | ΔSP | $(cal/cm^3)^{1/2}$ | −0.79 | −0.79 | −0.79 | −0.79 | −0.65 |
| resin |  |  | average diameter | μm | 21.65 | 21.85 | 22.05 | 19.68 | 19.27 |
| particle |  |  | CV value | % | 7.6 | 8.8 | 3.8 | 3.1 | 3.6 |
|  | spherical part |  | surface area | μm² | 1173 | 1173 | 1173 | 1173 | 1162 |
|  | peripheral part | convex part | average height | μm | 1.30 | 2.79 | 3.61 | 0.57 | 0.28 |
|  |  |  | average base diameter | μm | 4.65 | 6.10 | 7.24 | 1.07 | 0.65 |
|  |  |  | average height/average base diameter |  | 0.280 | 0.460 | 0.500 | 0.530 | 0.430 |
|  |  |  | average height/resin particle diameter |  | 0.060 | 0.128 | 0.164 | 0.029 | 0.015 |
|  |  |  | average height * average base diameter | μm² | 6.04 | 17.00 | 26.10 | 0.60 | 0.18 |
|  |  |  | contact angle | ° | 38 | 58 | 57 | 80 | 70 |
|  |  |  | number per one resin particle | number/one particle | 80 | 35 | 20 | 752 | 1323 |
|  |  |  | number density | numer/μm² | 0.07 | 0.03 | 0.02 | 0.64 | 1.14 |
|  |  |  | variation index (between particles) |  | 8.1 | 12.3 | 19.1 | 1.1 | 13.8 |
|  |  |  | vatiation index (on single particle) |  | 1.8 | 2.5 | 2.8 | 0.7 | 2.4 |
|  |  |  | melting point | ° C. | 250≤ | 250≤ | 250≤ | 250≤ | 250≤ |
|  |  |  | result of protrusion falling test |  | ○ | ○ | ○ | ○ | ○ |

TABLE 4

| | | | | | production example | | | | | |
|---|---|---|---|---|---|---|---|---|---|---|
| | | | | | 16 | 17 | 18 | 19 | 20 | 21 |
| | | | resin particle No. | | (16) | (17) | (18) | (19) | (20) | (21) |
| core | | | core particle No. | | 6 | 7 | | 8 | 9 | |
| | | | $SP_{CORE}$ | $(cal/cm^3)^{1/2}$ | 9.47 | 9.86 | | 9.54 | 10.04 | |
| shell | composition | silane monomer | MPTMS | parts | 14 | 14 | | 14 | 2.1 | 1.4 |
| | | | APTMS | parts | | | | | | |
| | | | VTMS | parts | | | 14 | | | |
| | | vinyl monomer | MAA | parts | | | — | | | |
| | | | CHMA | parts | | | — | | | |
| | | | NPGDMA | parts | | | — | | | |
| | | | 16HXA | parts | | | — | | | |
| | | | St | parts | 61.6 | 61.6 | — | 61.6 | 9.2 | 6.2 |
| | | | DVB | parts | 8.4 | 8.4 | — | 8.4 | 1.3 | 0.8 |
| | additives | | aqueous solution of surfactant | parts | 1.8 | 1.8 | — | 1.8 | 0.3 | 0.2 |
| | | | dispersing auxiliary agent | parts | 0.08 | 0.08 | — | 0.08 | 0.01 | 0.01 |
| | ratio | | shell silane monomer/core monomer composition | | 0.20 | 0.20 | 0.20 | 0.20 | 0.03 | 0.02 |
| | | | shell vinyl monomer/shell silane monomer | | 5.0 | 5.0 | — | 5.0 | 5.0 | 5.0 |
| | | | ΔSP | $(cal/cm^3)^{1/2}$ | -0.58 | -0.97 | -2.36 | -0.65 | -2.54 | -2.54 |
| resin particle | | | average diameter | μm | 24.92 | 22.09 | 18.50 | 5.48 | 20.32 | 20.12 |
| | | | CV value | % | 2.6 | 7.4 | 4.1 | 3.8 | 6.8 | 6.2 |
| | spherical part | | surface area | μm² | 1257 | 1075 | 1075 | 60 | 1225 | — |
| | peripheral part | convex part | average height | μm | 0.43 | 3.89 | 0.23 | 0.50 | 0.16 | — |
| | | | average base diameter | μm | 1.28 | 6.94 | 0.49 | 1.50 | 0.53 | — |
| | | | average height/average base diameter | | 0.340 | 0.560 | 0.470 | 0.340 | 0.300 | — |
| | | | average height/resin particle diameter | | 0.017 | 0.176 | 0.012 | 0.092 | 0.008 | — |
| | | | average height * average base diameter | μm² | 0.55 | 27.00 | 0.11 | 0.76 | 0.08 | — |
| | | | contact angle | ° | 60 | 65 | 84 | 44 | 65 | — |
| | | | number per one resin particle | number/one particle | 697 | 24 | 2050 | 36 | 1945 | — |
| | | | number density | numer/μm² | 0.55 | 0.02 | 1.91 | 0.59 | 1.59 | — |
| | | | variation index (between particles) | | 13.6 | 15.8 | 9.5 | 11.2 | 5.0 | — |
| | | | vatiation index (on single particle) | | 3.8 | 5.2 | 0.4 | 2.5 | 0.6 | — |
| | | | melting point | °C. | 250≤ | 250≤ | 250≤ | 250≤ | 250≤ | 250≤ |
| | | | result of protrusion falling test | | ○ | ○ | ○ | ○ | ○ | — |

| | | | | | production example | | | | |
|---|---|---|---|---|---|---|---|---|---|
| | | | | | 22 | 23 | 24 | 25 | 26 |
| | | | resin particle No. | | (22) | (23) | (24) | (25) | (26) |
| core | | | core particle No. | | 10 | 11 | 12 | 13 | 2 |
| | | | $SP_{CORE}$ | $(cal/cm^3)^{1/2}$ | 9.54 | 9.54 | 9.56 | 9.56 | 9.54 |
| shell | composition | silane monomer | MPTMS | parts | 14 | 14 | 14 | 14 | |
| | | | APTMS | parts | | | | | |
| | | | VTMS | parts | | | | | |
| | | vinyl monomer | MAA | parts | | | | | |
| | | | CHMA | parts | | | | | |
| | | | NPGDMA | parts | | | | | 10.0 |
| | | | 16HXA | parts | | | | | |
| | | | St | parts | 61.6 | 61.6 | 61.6 | 61.6 | 40.0 |
| | | | DVB | parts | 8.4 | 8.4 | 8.4 | 8.4 | |
| | additives | | aqueous solution of surfactant | parts | 1.8 | 1.8 | 1.8 | 1.8 | — |
| | | | dispersing auxiliary agent | parts | 0.08 | 0.08 | 0.08 | 0.08 | — |
| | ratio | | shell silane monomer/core monomer composition | | 0.20 | 0.20 | 0.20 | 0.20 | — |
| | | | shell vinyl monomer/shell silane monomer | | 5.0 | 5.0 | 5.0 | 5.0 | — |
| | | | ΔSP | $(cal/cm^3)^{1/2}$ | -0.65 | -0.65 | -0.67 | -0.67 | — |
| resin particle | | | average diameter | μm | 27.79 | 25.50 | 16.65 | 15.42 | 9.62 |
| | | | CV value | % | 40.2 | 7.3 | 31.1 | 6.6 | 2.4 |
| | spherical part | | surface area | μm² | 1494 | 1322 | 518 | 439 | 272 |
| | peripheral part | convex part | average height | μm | 0.26 | 0.22 | 0.21 | 0.19 | 0.08 |
| | | | average base diameter | μm | 0.87 | 0.81 | 0.45 | 0.39 | 0.08 |
| | | | average height/average base diameter | | 0.300 | 0.270 | 0.470 | 0.490 | 1.000 |
| | | | average height/resin particle diameter | | 0.009 | 0.009 | 0.013 | 0.012 | 0.008 |
| | | | average height * average base diameter | μm² | 0.23 | 0.18 | 0.09 | 0.07 | 0.01 |

TABLE 4-continued

| | | | | | | | | | |
|---|---|---|---|---|---|---|---|---|---|
| | contact angle | | ° | 57 | 53 | 83 | 80 | 175 | |
| | number per one resin particle | number/one particle | | 1563 | 1542 | 3009 | 2967 | 2 | |
| | number density | numer/μm² | | 1.05 | 1.17 | 5.81 | 6.76 | 0.01 | |
| | variation index (between particles) | | | 2.0 | 1.9 | 8.7 | 8.9 | 43.5 | |
| | vatiation index (on single particle) | | | — | — | — | — | 15.0 | |
| | melting point | | °C. | 250≤ | 250≤ | 250≤ | 250≤ | 250≤ | |
| | result of protrusion falling test | | | ○ | ○ | ○ | ○ | X | |

| | | | | | | production example | | | |
|---|---|---|---|---|---|---|---|---|---|
| | | | | | | 27 | 28 | 29 | 30 |
| | | | resin particle No. | | | (27) | (28) | (29) | (30) |
| core | | | core particle No. | | | 9 | | 14 | 15 |
| | | | SP$_{CORE}$ | | (cal/cm³)$^{1/2}$ | 10.04 | | 10.03 | 9.81 |
| shell | composition | silane | MPTMS | | parts | | | 14 | |
| | | monomer | APTMS | | parts | | | | 14 |
| | | | VTMS | | parts | | | | |
| | | vinyl | MAA | | parts | | 10.0 | | |
| | | monomer | CHMA | | parts | | | | |
| | | | NPGDMA | | parts | 10.0 | | | |
| | | | 16HXA | | parts | | | | |
| | | | St | | parts | 40.0 | 90.0 | | |
| | | | DVB | | parts | | | 7.0 | 7.0 |
| | additives | | aqueous solution of surfactant | | parts | — | — | 0.2 | 0.2 |
| | | | dispersing auxiliary agent | | parts | — | — | — | — |
| | ratio | | shell silane monomer/core monomer composition | | | — | — | 0.20 | 0.20 |
| | | | shell vinyl monomer/shell silane monomer | | | — | — | 0.5 | 0.5 |
| | | | ΔSP | | (cal/cm³)$^{1/2}$ | — | — | −1.15 | −0.92 |
| resin | | | average diameter | | μm | 20.35 | 20.20 | 3.16 | 3.16 |
| particle | | | CV value | | % | 4.6 | 6.7 | 4.2 | 2.3 |
| | spherical part | | surface area | | μm² | 1225 | 1225 | 28 | 28 |
| | peripheral part | convex | average height | | μm | 0.12 | 0.30 | 0.50 | 0.39 |
| | | part | average base diameter | | μm | 0.12 | 0.30 | 1.37 | 1.33 |
| | | | average height/average base diameter | | | 1.000 | 1.000 | 0.360 | 0.290 |
| | | | average height/resin particle diameter | | | 0.006 | 0.015 | 0.158 | 0.123 |
| | | | average height * average base diameter | | μm² | 0.01 | 0.09 | 0.69 | 0.52 |
| | | | contact angle | | ° | 172 | 178 | 36 | 31 |
| | | | number per one resin particle | number/one particle | | 4 | 15 | 24 | 23 |
| | | | number density | numer/μm² | | 0.00 | 0.01 | 0.87 | 0.81 |
| | | | variation index (between particles) | | | 35.2 | 38.4 | 11.8 | 6.7 |
| | | | vatiation index (on single particle) | | | 16.5 | 18.9 | 6.0 | 4.8 |
| | | | melting point | | °C. | 250≤ | 250≤ | 250≤ | 250≤ |
| | | | result of protrusion falling test | | | X | X | ○ | ○ |

As a result of the scanning transmission electron microscope observation, the resin particles obtained in Production Examples 1 to 7, 9 to 20, 22 to 25, 29 and 30 found to have a spherical part and a plurality of convex part formed on the surface of the spherical part, and the boundary between the convex and the spherical parts was swollen to the convex part side, which was resistant to the detachment of the convex part. The spherical part boundary was continuous without having an inflection point regardless of the presence or absence of the convex part. The contact angle when the convex part was assumed to be the droplet with respect to the spherical part was about 17 degrees to about 84 degrees. Furthermore, as apparent from FIGS. 4 to 6, the resin particles obtained in Production Examples 1 to 7, 9 to 20, 22 to 25, 29, and 30 had a uniform size (height, base diameter) and dispersion, and were thus useful for resin additives (an anti-blocking agent and a light diffusion agent), additive agents for decorative sheets, bulking agents for cosmetics, and substrates of conductive microparticles.

Examples 1 to 23 and Comparative Examples 1 to 5

A palladium nucleus was formed by a method including subjecting a resin particle as a substrate to an etching treatment using sodium hydroxide, thereafter bringing the resin particle into contact with a tin dichloride solution to perform sensitizing, and then immersing the resin particle in a palladium dichloride solution to perform activating (sensitizing-activation method). Next, 2 parts of the resin particle on which the palladium nucleus was formed were added to 400 parts of ion exchange water, and the ion exchange water was subjected to an ultrasonic dispersion treatment to obtain a resin particle suspension. The obtained resin particle suspension was warmed at 70° C. in a hot bath. By separately adding 600 parts of an electroless plating liquid ("SUMMER 5680" manufactured by Japan Kanigen Co., Ltd.) warmed to 70° C. to the suspension in a state where the suspension was warmed thus, an electroless nickel plating reaction was produced. After the generation completion of hydrogen gas was confirmed, solid-liquid separation was performed. The obtained solid was washed with ion exchange water and methanol in this order, and then vacuum-dried at 100° C. for 2 hours to obtain a particle to which a nickel plating was applied. Then, the obtained nickel plated particle was added to a substitution gold plating liquid containing gold cyanide potassium, and a gold plating was further applied to the surface of a nickel layer to obtain a conductive microparticle.

The results of the contact angle of the convex part of the substrate particle (resin particle), film thickness of the conductive metal layer, and conductive evaluation of each of the obtained conductive microparticles were shown in Table 5.

TABLE 5

| resin particle No. | contact angle of convex part (°) | thickness of conductive metal layer (nm) | conductivity evaluation |
|---|---|---|---|
| Example 1 | (1) | 68 | 100 | very good |
| Example 2 | (2) | 79 | 100 | verygood |
| Example 3 | (3) | 57 | 100 | verygood |
| Example 4 | (4) | 63 | 100 | very good |
| Example 5 | (5) | 60 | 100 | verygood |
| Example 6 | (6) | 29 | 100 | average |
| Example 7 | (7) | 17 | 100 | average |
| Comparative Example 1 | (8) | — | 100 | poor |
| Example 8 | (9) | 54 | 100 | very good |
| Example 9 | (10) | 41 | 100 | good |
| Example 10 | (11) | 38 | 100 | good |
| Example 11 | (12) | 58 | 100 | very good |
| Example 12 | (13) | 57 | 100 | very good |
| Example 13 | (14) | 80 | 100 | very good |
| Example 14 | (15) | 70 | 100 | very good |
| Example 15 | (16) | 60 | 100 | very good |
| Example 16 | (17) | 65 | 100 | very good |
| Example 17 | (18) | 84 | 100 | very good |
| Example 18 | (19) | 44 | 100 | good |
| Example 19 | (20) | 65 | 100 | very good |
| Comparative Example 2 | (21) | — | 100 | poor |
| Example 20 | (23) | 53 | 100 | very good |
| Example 21 | (25) | 80 | 100 | very good |
| Comparative Example 3 | (26) | 175 | 100 | poor |
| Comparative Example 4 | (27) | 172 | 100 | poor |
| Comparative Example 5 | (28) | 178 | 100 | poor |
| Example 22 | (29) | 36 | 100 | very good |
| Example 23 | (30) | 31 | 100 | very good |

The substrate particle (resin particle) had a plurality of convex part, and the conductive microparticle of each of Examples 1 to 23 had excellent conductivity when the conductive microparticle was made of an anisotropic conductive material. As the contact angle of the convex part increased in the range of not more than 90 degrees, the conductivity tended to be excellent. On the other hand, Comparative Examples 1 and 2 using the substrate particle (resin particle) having no convex part and Comparative Examples 3 to 5 in which the curvature center of the boundary between the peripheral and the spherical parts did not exist in the spherical part tended to cause the detachment of the convex part when the conductive microparticle was made of the anisotropic conductive material, and the conductivity were poor.

INDUSTRIAL APPLICABILITY

Since a resin particle of the present invention has a convex part having a uniform size and a uniform protrusion density, and is resistant to the detachment of the convex part, the resin particle is useful for extensive uses such as resin additive (an anti-blocking agent and a light diffusion agent), additive agents for decorative sheets, bulking agents for cosmetics, and substrates of conductive microparticles. Furthermore, since a conductive microparticle of the present invention contains a resin particle having a plurality of convex part on the surface of the resin particle and a conductive metal layer covering the resin particle along the shape of the convex part, the conductive microparticle with resistance to the convex part detachment becomes able to be obtained regardless of plating conditions. For this reason, the conductive microparticle is extremely useful for anisotropic conductive materials such as an anisotropic conductive film, an anisotropic conductive paste, an anisotropic conductive adhesive, and an anisotropic conductive ink.

REFERENCE SIGNS LIST 1 a spherical part
2a a peripheral part
2b a peripheral layer
3 a convex part
4 a triangle
5 a base of a triangle
6a, 6b a starting point of a convex part
8 a top part of a convex part
9a a tangent with respect to a surface of a convex part
9b a tangent with respect to a surface of a peripheral part
10 a boundary

The invention claimed is:

1. A resin particle comprising: a spherical part and a peripheral part having a plurality of convex parts formed on the surface of the spherical part,
   wherein the spherical part and the peripheral part comprise a vinyl polymer and/or a polysiloxane component,
   the spherical part and the peripheral part are different in the composition,
   the melting point of the peripheral part is not less than 200° C., and
   the curvature center of the boundary between the peripheral part and the spherical part determined by a transmission electron microscope observation of the cross-section of the resin particle exists in the spherical part.

2. The resin particle according to claim 1, wherein the average height of the convex part is not less than 0.05 μm and not more than 5 μm.

3. The resin particle according to claim 1, wherein the average diameter of the convex part base is not less than 0.1 μm and not more than 10 μm.

4. The resin particle according to claim 1, wherein the number density of the convex part is not less than 0.01 μm$^{-2}$ and not more than 10 μm$^{-2}$.

5. The resin particle according to claim 1, wherein the volume average particle diameter is not less than 1 μm and not more than 50 μm.

6. The resin particle according to claim 1, wherein the number of the convex part per one resin particle is not less than 5 and not more than 5000.

7. The resin particle according to claim 1, wherein the contact angle of the convex part is not more than 90°.

8. The resin particle according to claim 1, wherein the resin particle has a core-shell structure comprising a core and a shell, the core includes the spherical part and the shell includes the peripheral part.

9. A conductive microparticle comprising the resin particle according to claim 1 and a conductive metal layer covering the surface convex part of the resin particle along the shape of the convex part.

10. An anisotropic conductive material comprising the conductive microparticle according to claim 9.

* * * * *